United States Patent
Shigemizu et al.

(10) Patent No.: US 8,917,060 B2
(45) Date of Patent: Dec. 23, 2014

(54) SECONDARY CELL CONTROL SYSTEM

(75) Inventors: Tetsuro Shigemizu, Nagasaki (JP);
Takehiko Nishida, Nagasaki (JP);
Katsuo Hashizaki, Nagasaki (JP);
Hidehiko Tajima, Nagasaki (JP);
Katsuaki Kobayashi, Nagasaki (JP);
Kazuyuki Adachi, Fukuoka (JP); Shinji Murakami, Fukuoka (JP); Yoshihiro Wada, Fukuoka (JP); Hiroyuki Shibata, Fukuoka (JP); Kouji Kurayama, Fukuoka (JP)

(73) Assignees: Mitsubishi Heavy Industries, Ltd., Tokyo (JP); Kyushu Electric Power Co., Inc., Fukuoka (JP)

(*) Notice: Subject to any disclaimer, the term of this patent is extended or adjusted under 35 U.S.C. 154(b) by 871 days.

(21) Appl. No.: 13/059,611

(22) PCT Filed: Jun. 30, 2009

(86) PCT No.: PCT/JP2009/061993
§ 371 (c)(1),
(2), (4) Date: May 9, 2011

(87) PCT Pub. No.: WO2010/044290
PCT Pub. Date: Apr. 22, 2010

(65) Prior Publication Data
US 2011/0221394 A1 Sep. 15, 2011

(30) Foreign Application Priority Data

Oct. 15, 2008 (JP) .................. 2008-266570

(51) Int. Cl.
*H02J 7/00* (2006.01)
*H01M 10/48* (2006.01)
*H01M 10/44* (2006.01)

(52) U.S. Cl.
CPC .......... *H01M 10/441* (2013.01); *H01M 10/482* (2013.01); *H02J 7/0018* (2013.01); *H02J 7/0016* (2013.01)
USPC ......................................... 320/118; 320/132

(58) Field of Classification Search
CPC ....................................................... H02J 7/0016
See application file for complete search history.

(56) References Cited

U.S. PATENT DOCUMENTS 5,206,578 A * 4/1993 Nor .............................. 320/118
5,811,959 A 9/1998 Kejha
(Continued)

FOREIGN PATENT DOCUMENTS

CN 1311860 A 9/2001
CN 1845418 A 10/2006
(Continued)

OTHER PUBLICATIONS

Decision to Grant a Patent isssued in the corresponding Japanese Application No. 2008-266570 on Dec. 4, 2013 with an English translation of the relevant portion.
(Continued)

*Primary Examiner* — Drew A Dunn
*Assistant Examiner* — Steve T Chung
(74) *Attorney, Agent, or Firm* — Birch, Stewart, Kolasch & Birch, LLP

(57) ABSTRACT

A secondary cell control system includes a plurality of cells; a charging circuit section and a discharging circuit section. The charging circuit section charges cells selected from among said plurality of cells, and the discharging circuit section discharges cells selected from among said plurality of cells.

19 Claims, 44 Drawing Sheets

(56) References Cited

U.S. PATENT DOCUMENTS

| | | | |
|---|---|---|---|
| 6,114,835 A | 9/2000 | Price | |
| 6,285,163 B1 | 9/2001 | Watanabe et al. | |
| 6,456,042 B1* | 9/2002 | Kwok | 320/134 |
| 2006/0071643 A1 | 4/2006 | Carrier et al. | |
| 2007/0194754 A1 | 8/2007 | Fukuzawa et al. | |
| 2007/0222418 A1* | 9/2007 | Le Gall et al. | 320/136 |
| 2008/0180063 A1* | 7/2008 | Wynne et al. | 320/135 |
| 2008/0284380 A1* | 11/2008 | Chen et al. | 320/154 |
| 2009/0208821 A1* | 8/2009 | Kosugi et al. | 429/61 |
| 2010/0244781 A1* | 9/2010 | Kramer et al. | 320/162 |
| 2011/0218745 A1* | 9/2011 | Hasan et al. | 702/58 |

FOREIGN PATENT DOCUMENTS

| | | |
|---|---|---|
| JP | 6-253463 A | 9/1994 |
| JP | 10-32936 A | 2/1998 |
| JP | 10-285818 A | 10/1998 |
| JP | 2000-312404 A | 11/2000 |
| JP | 2001-95169 A | 4/2001 |
| JP | 2001-136669 A | 5/2001 |
| JP | 2003-153460 A | 5/2003 |
| JP | 2003-284253 A | 10/2003 |
| JP | 2004-80909 A | 3/2004 |
| JP | 2006-79962 A | 3/2006 |
| WO | WO 01/33690 A1 | 5/2001 |

OTHER PUBLICATIONS

Chinese Office Action for corresponding Application No. 200980133854.4 mailed Dec. 31, 2012 with English translation.

Search Report dated Feb. 12, 2014 of corresponding EP Application No. 09820468.8.

* cited by examiner

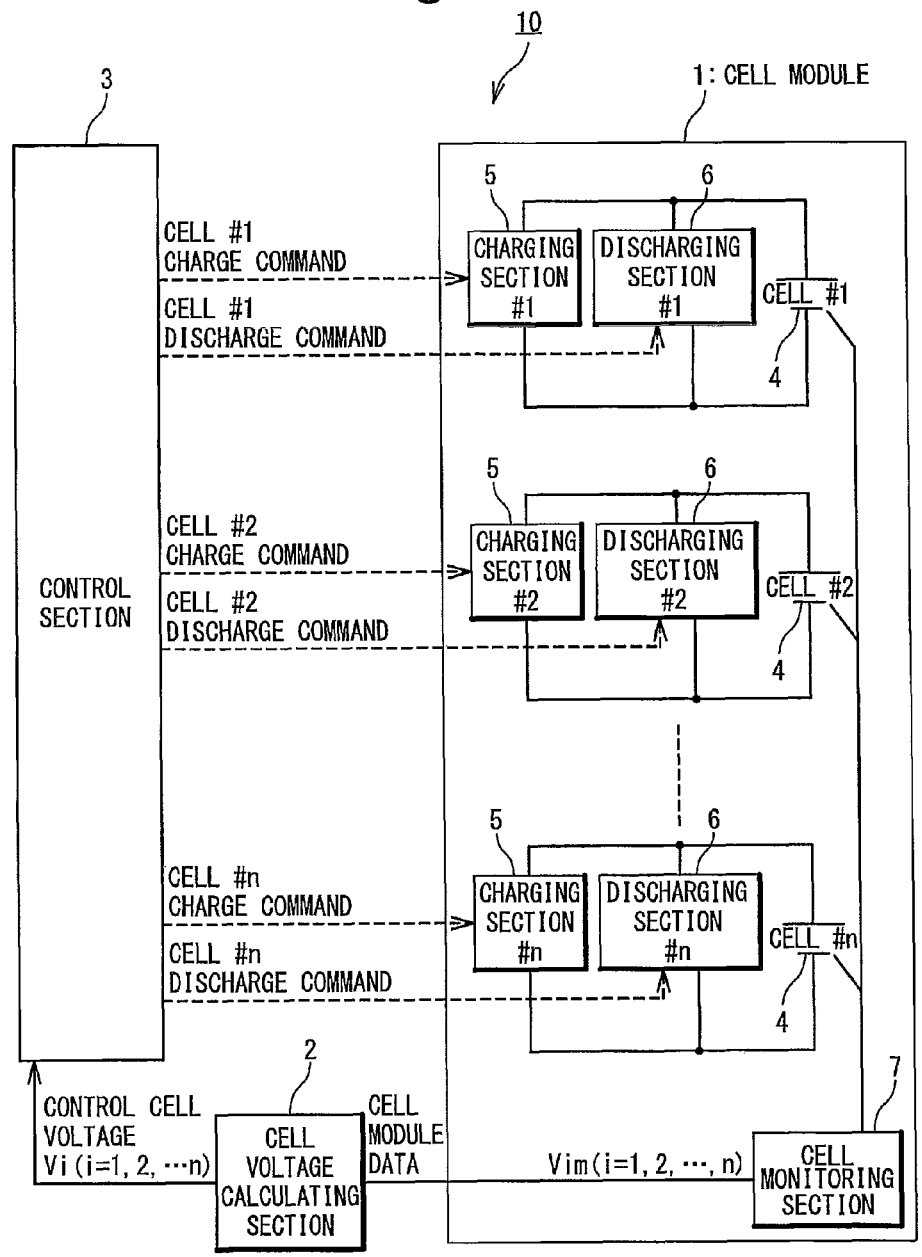

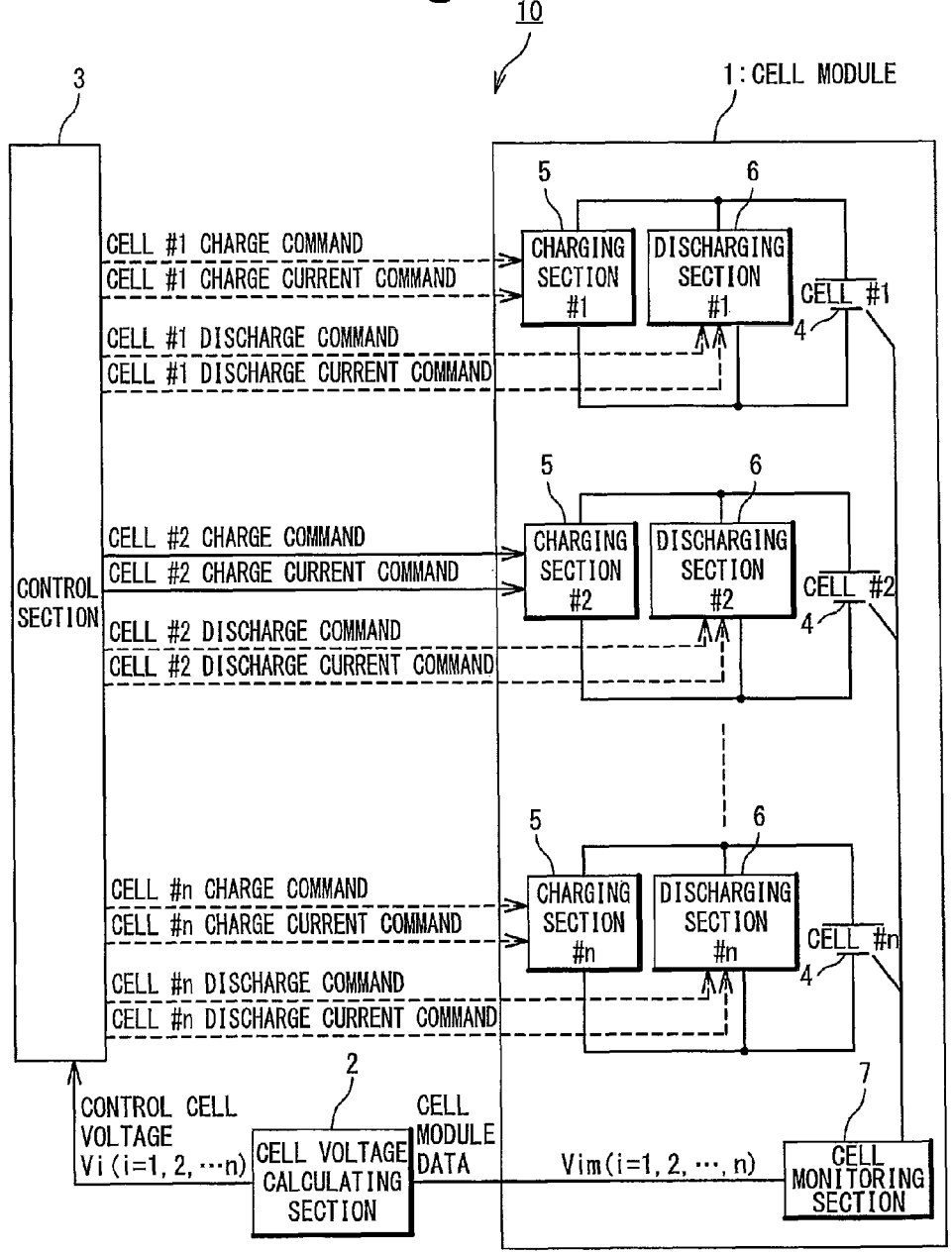

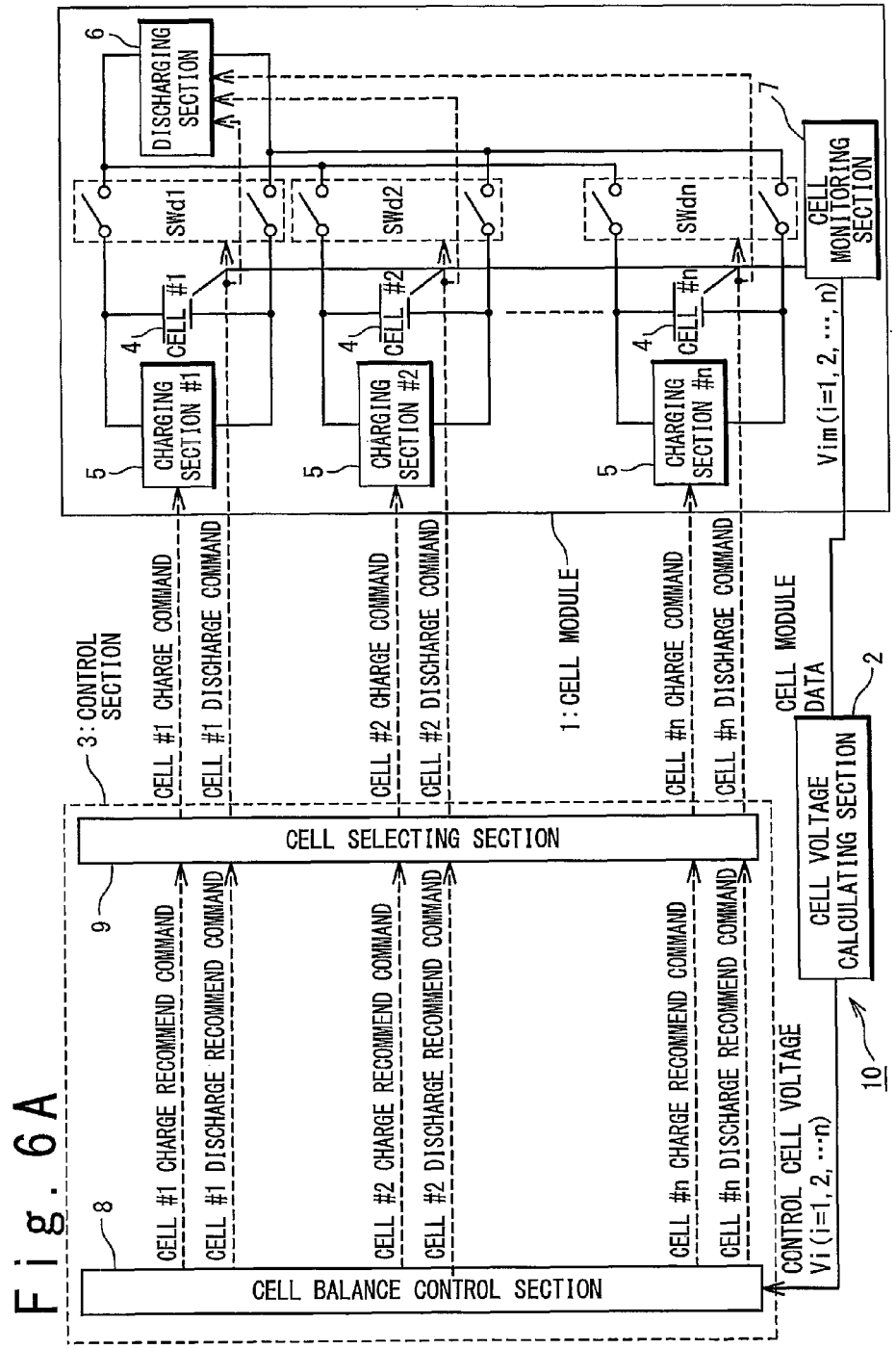

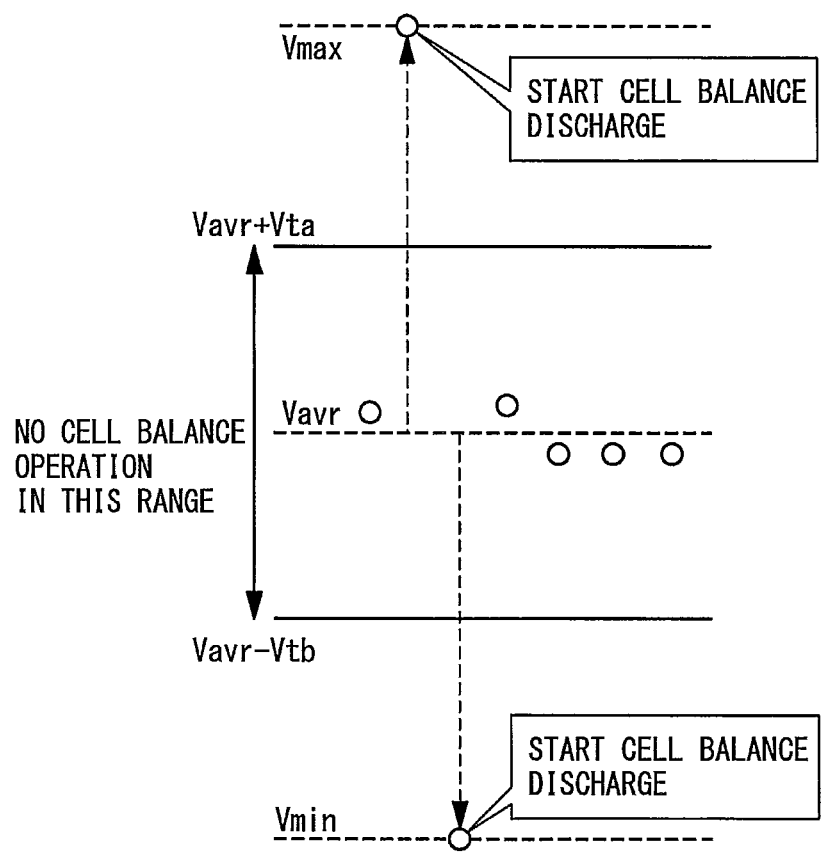

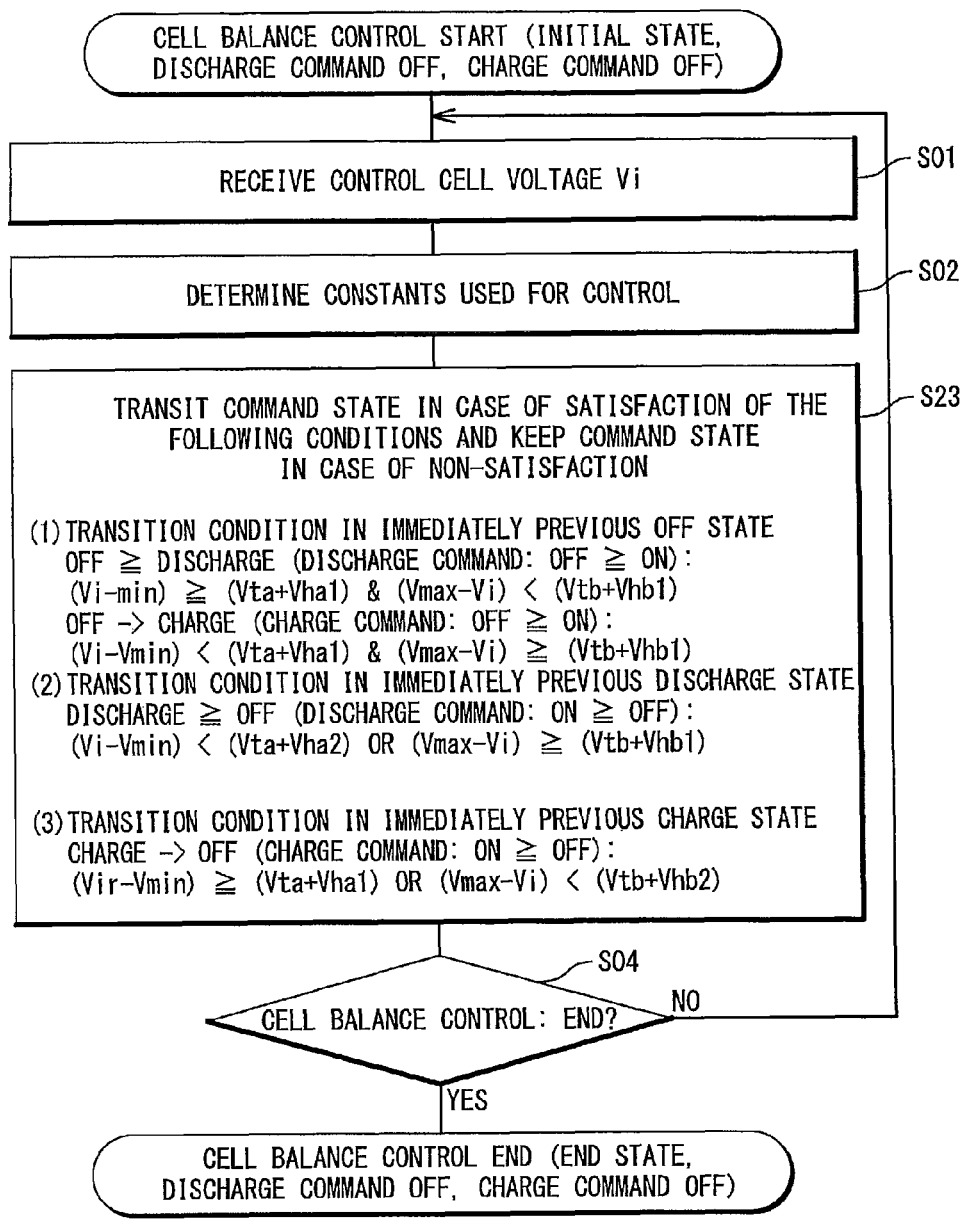

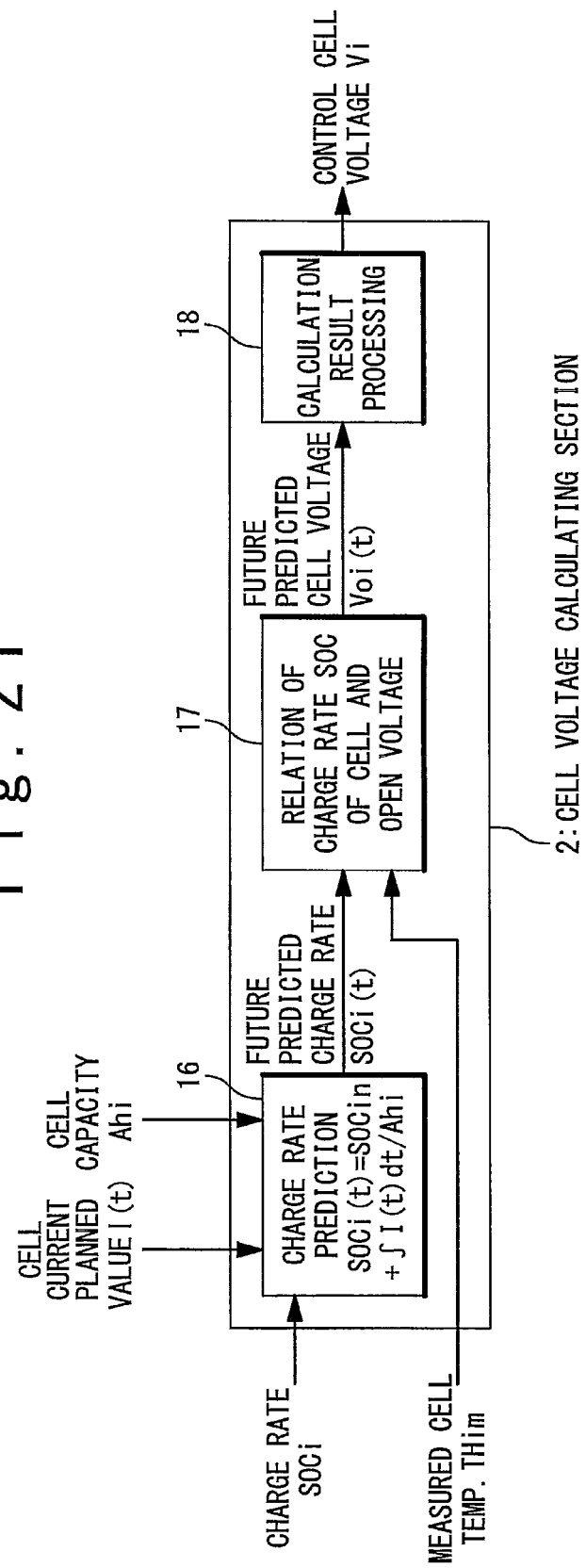

SECONDARY CELL CONTROL SYSTEM

TECHNICAL FIELD

The present invention relates to a secondary cell control system having a cell assembly, and especially relates to a technique for controlling a cell balance of secondary cells included in the cell assembly.

BACKGROUND ART

In a cell assembly configured by combining a plurality of secondary cell cells (called a cell module or modular cell), it is important to control cell balance, that is, uniformity of cell voltages of the respective cells (single cells). When a cell voltage of a particular cell is excessively higher or lower than the cell voltages of other cells, the particular cell is sometimes over-charged or over-discharged, and accordingly deterioration of the particular cell is rapidly progressed. Especially, in a cell assembly configured by combining a plurality of lithium ion secondary cells, it is highly required to prevent the over-charge and over-discharge, and it is important to maintain the cell balance.

As shown in FIGS. 1A to 1C, as an operation method of controlling the cell balance (hereinafter referred to as a "cell balance control"), a method is known of discharging from a cell charged to a higher cell voltage (a discharging method). In this method, the cell voltages of the respective cells of the cell assembly are detected, and the minimum cell voltage of them are found. When the cell voltage of a particular one of the cells (not limited to one) is higher than the minimum cell voltage, exceeding a permissible range, the cell voltage is lowered by discharging from the particular cell.

As shown in FIGS. 2A to 2C, in another method of the cell balance control, a cell having a lower cell voltage is charged (a charging method). In this method, the cell voltages of the respective cells of the cell assembly are detected, and the maximum cell voltage of them is found. When the cell voltage of a particular one of the cells is lower than a maximum cell voltage, exceeding a permissible range, the cell voltage is increased by charging the particular cell.

However, the above-mentioned two methods both have a problem of a large energy loss. In the discharging method, when the cell voltages of a few cells are high (in a case of FIG. 1A), the cell balance control is carried out by discharging from the few cells. Accordingly, the cell balance can be controlled in a little energy loss. However, when the cell voltages of the few cells are low (in cases of FIGS. 1B and 1C), discharging is carried out from many cells other than the few cells. Thus, much energy is wasted for the cell balance control.

Since the charging is associated with energy loss at least, the same situation is applied to the charging method. In a case where the cell voltages of the few cells are low (in a case of FIG. 2A), the cell balance control is carried out by charging the few cells. Accordingly, the cell balance can be controlled in a little energy loss. However, when the cell voltages of the few cells are high (in cases of FIG. 2B and FIG. 2C), many cells other than the few cells are charged. Accordingly, the energy loss in the charging is large.

In conjunction with this, in JP H06-253463A, a circuit of carrying out the cell balance control through charging; and a circuit of carrying out the cell balance control through discharging are disclosed. It should be noted that it is not disclosed and suggested that a circuit of carrying out the cell balance control through the charging; and a circuit of carrying out the cell balance control through the discharging are prepared for one cell assembly.

From such a viewpoint, provision of a technique of reducing energy loss in a cell balance control is desired.

CITATION LIST

Patent Literature

[Patent Literature 1]: JP H06-253463A

SUMMARY OF THE INVENTION

An object of the present invention is to provide a technique of reducing an energy loss in a cell balance control.

In one aspect of the present invention, secondary cell control system includes a plurality of cells; a charging circuit section configured to charge cells selected from among the plurality of cells; and a discharging circuit section configured to discharge cells selected from among the plurality of cells. This secondary cell system can separately and suitably use the charging and the discharging depending on the conditions of the cells, and a cell balance control of higher energy efficiency can be carried out.

In one example, the charging circuit section includes a plurality of charging sections provided for a number equal to that of the plurality of cells and respectively connected to the plurality of cells to charge the plurality of cells.

In one example, the discharging circuit section includes a plurality of discharging sections provided for a number equal to that of the plurality of cells and respectively connected to the plurality of cells to discharge the plurality of cells.

In addition, the charging circuit section may include charging sections provided for a number less than that of the plurality of cells, and the discharging circuit section may include discharging sections provided for a number equal to that of the charging sections, and respectively connected in parallel to the charging sections. The secondary cell control system further includes switches configured to switch connections between the plurality of cells and the charging sections or the discharging sections.

In addition, the charging circuit section may include charging sections provided for a number less than that of the plurality of cells, and the secondary cell control system further includes charging-side switches configured to switch connections between the charging sections and the plurality of cells. In this case, the charging sections charge cells of the plurality of cells which are connected to the charging sections by the charging-side switches.

In the same manner, the discharging circuit section may include discharging sections provided for a number less than that of the plurality of cells, and the secondary cell control system may further include discharging-side switches configured to switch connections between the discharging sections and the plurality of cells. In this case, the discharging section discharges a cell connected by a discharging-side switch of the plurality of cells.

The secondary cell control system may further include a cell voltage calculating circuit section configured to calculate control cell voltages based on cell voltages of the plurality of cells or to directly determine the cell voltages as the control cell voltages, with respect to each of the plurality of cells; and a control circuit section configured to select the cells to be charged and the cells to be discharged from among the plurality of cells in response to the control cell voltages.

In one example, the control circuit section determines a target cell voltage, selects the cells to be discharged based on a comparison result between the control cell voltages and a first threshold value defined by using the target cell voltage, and selects the cells to be charged based on a comparison result between the control cell voltages and a second threshold value defined by using the target cell voltage. In this case, the selection of the cells to be discharged by the control circuit section is carried out based on a comparison result of the control cell voltages and a third threshold value defined by using a minimum value of the control cell voltages in addition to the comparison result of the first threshold value and the control cell voltages, and the selection of the cells to be charged by the control circuit section carried out based on a comparison result between the control cell voltages and a fourth threshold value defined by using a maximum value of the control cell voltages in addition to the comparison result between the second threshold value and the control cell voltages.

In another example, the control circuit section selects the cells to be discharged based on a comparison result between the control cell voltages and a fifth threshold value defined by using the minimum value of the control cell voltages and a comparison result between the control cell voltages and a sixth threshold value defined by using the maximum value of the control cell voltages, and selects the cells to be charged based on a comparison result between the control cell voltages and a seventh threshold value defined by using the maximum value and a comparison result between the control cell voltages and an eighth threshold value defined by using the minimum value.

In further another example, the control circuit section determines a voltage range of a predetermined width such that the number of cells having the control cell voltages belonging to the voltage range is the maximum, selects the cells to be discharged based on a comparison result between an upper limit value of the voltage range and the control cell voltages, and selects the cells to be charged based on a comparison result between a lower limit value of the voltage range and the control cell voltages.

When the discharging circuit section includes a plurality of discharging sections provided for a number equal to that of the plurality of cells and respectively connected to the plurality of cells to discharge the plurality of cells, the cells to be discharged are subjected to actual discharge by the plurality of discharging sections. In the same manner, when wherein the charging circuit section includes a plurality of charging sections provided for a number equal to that of the plurality of cells and respectively connected to the plurality of cells to charge the plurality of cells, the cells to be charged are subjected to actual charge by the plurality of charging sections.

In a configuration where the discharging circuit section includes the discharging sections of only the number less than that of the plurality of cells, the number of cells selected as the cells to be discharged sometimes may be larger than the number of the discharging sections. To handle such situation, it is preferred for the control circuit section to operate as follows.

In one example, the control circuit section determines priorities based on the control cell voltages when the number of the selected cells to be discharged is larger than the number of the discharging sections, and selects the cells to be actually discharged based on the determined priorities. In another example, the control circuit section determines priorities based on recommendation times started with discharge recommendations when the number of the selected cells to be discharged is larger than the number of the discharging sections, and selects the cells to be actually discharged based on the determined priorities. In further another example, the control circuit section determines priorities based on discharge currents determined to the cells to be discharged or resistance values of variable resistances included in the discharging sections when the number of selected cells to be discharged is larger than the number of the discharging sections, and selects the cells to be actually discharged based on the determined priorities. In further another example, the control circuit section selects the cells to be actually discharged based on priorities which are determined based on degrees of deterioration of the plurality of cells when the number of selected cells to be discharged is larger than the number of the discharging sections. In further another example, the control circuit section selects the cells to be actually discharged based on priorities which are determined based on capacities of the plurality of cells when the number of selected cells to be discharged is larger than the number of the discharging sections.

Also, when the charging circuit section only includes the charging sections of the number less than that of the plurality of cells, the same problem may occur. In one example, the control circuit section determines priorities based on the control cell voltages, recommendation times started with discharge recommendations, charge currents or charge voltages determined to the cells to be charged, degrees of deterioration of the plurality of cells, or capacities of the plurality of cells when the number of selected cells to be charged is larger than the number of the charging sections, and selects the cells to be actually charged based on the determined priorities. The same is true to a case where the charging circuit section includes the charging sections for the number less than the number of the plurality of cells and where the discharging circuit sections are the same in number of the charging sections and includes the discharging sections that are respectively connected the charging sections in parallel with the charging sections.

As other methods, the cells selected to be discharged may be subjected to discharging in a time-division manner by the discharging sections when the number of cells selected to be discharged is larger than the number of discharging sections. In addition, the cells selected to be charged may be subjected to charging in a time-division manner by the charging sections when the number of cells selected to be charged is larger than the number of charging sections. Moreover, the cells selected to be charged and the cells selected to be discharged are subjected to charging and discharging in a time-division manner by the charging sections and the discharging sections when a total of the number of selected cells to be charged and the number of selected cells to be discharged is larger than the number of pairs of the charging section and the discharging section.

BRIEF DESCRIPTION OF THE DRAWINGS

FIG. 3A is a block diagram showing a configuration of a secondary cell control system according to a first embodiment of the present invention;

FIG. 3B is a block diagram showing another configuration of the secondary cell control system according to the first embodiment;

FIG. 6A is a block diagram showing a configuration of the secondary cell control system according to a fourth embodiment of the present invention;

FIG. 8D is a diagram schematically showing the first selection method for selecting the cell to be charged or discharged;

FIG. 15 shows a flowchart in an operation of the third selection method;

FIG. 21 is a diagram showing a configuration of the cell voltage calculating section.

DESCRIPTION OF EMBODIMENTS

Figure 1A:
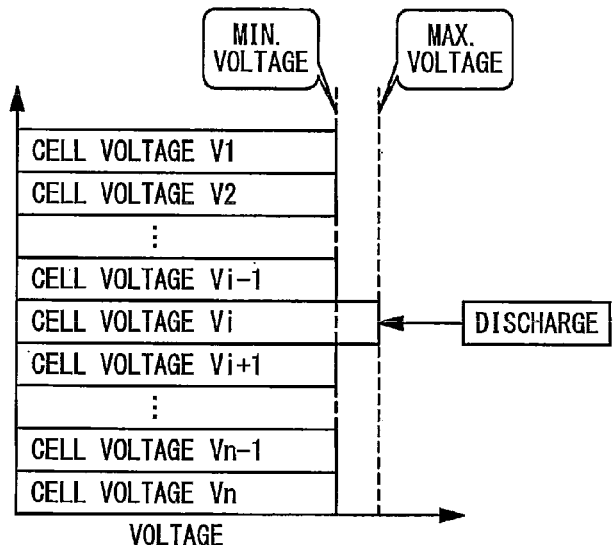
FIG. 1A is a diagram schematically showing a conventional cell balance control by using a discharging method.
Figure 1B:
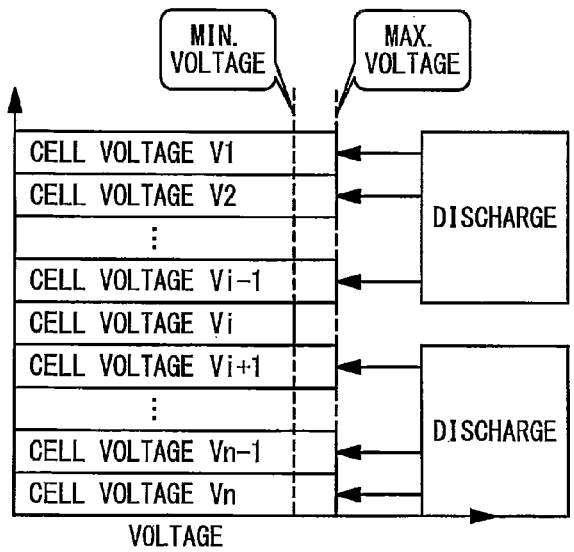
FIG. 1B is a diagram schematically showing the conventional cell balance control using the discharging method.
Figure 1C:
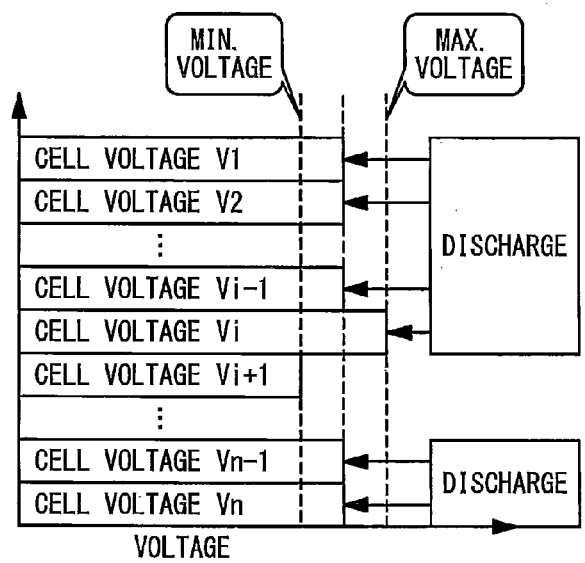
FIG. 1C is a diagram schematically showing the conventional cell balance control using the discharging method.
Figure 2A:
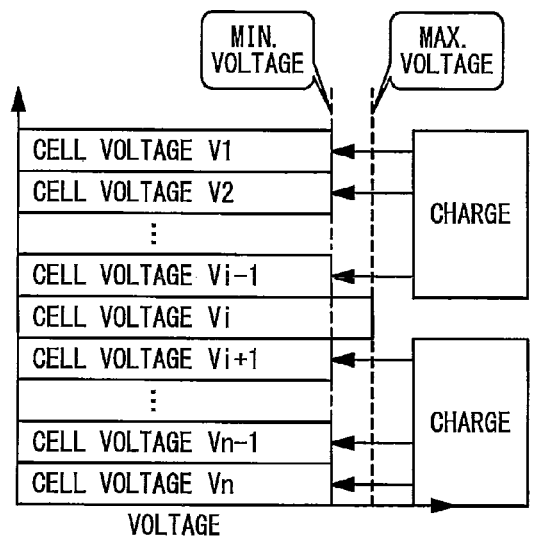
FIG. 2A is a diagram schematically showing conventional cell balance control using the charging method.
Figure 2B:
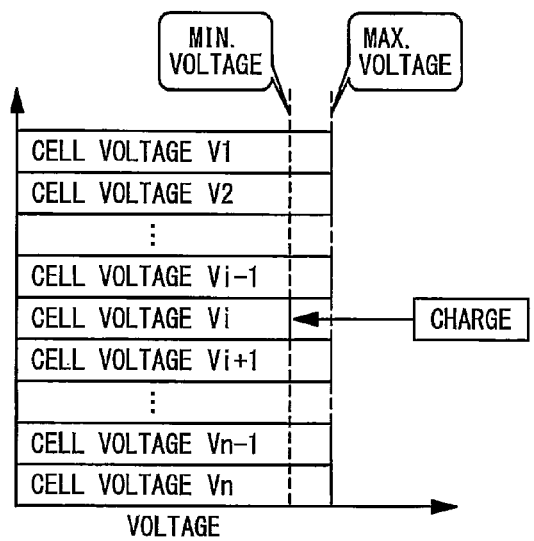
FIG. 2B is a diagram schematically showing the conventional cell balance control using the charging method.
Figure 2C:
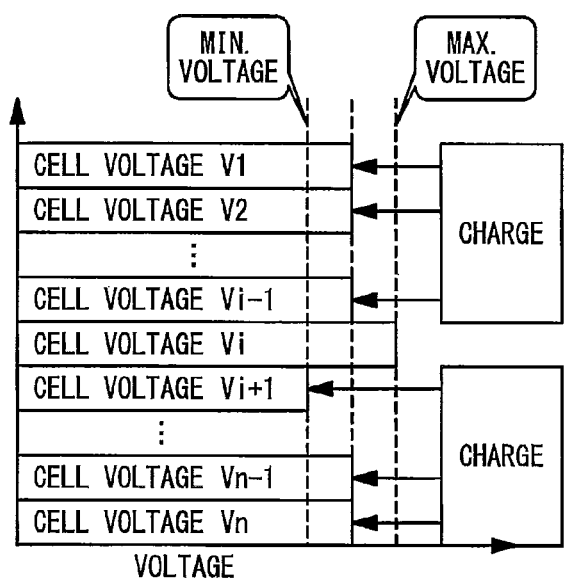
FIG. 2C is a diagram schematically showing the conventional cell balance control using the charging method.

1. Configuration of Secondary Cell Control System
[First Embodiment]

FIG. 3A is a block diagram showing a configuration of a secondary cell control system according to a first embodiment of the present invention. A secondary cell control system 10 includes a cell module (cell module) 1, a cell voltage calculating section 2, and a control section 3.

The cell module 1 includes n cells (single cells) 4 that are connected in series; charging sections 5; discharging sections 6; and a cell monitoring section 7. The charging sections 5 are circuit sections having functions of charging the respective cells 4, and the discharging sections 6 are circuit sections having functions of discharging the respective cells 4. In the present embodiment, one charging section 5 and one discharging section 6 are provided to each of the cells 4, respectively. In the following description, the respective cells 4 are described as cells #1 to #n in a case of being required to be identified from each other. Additionally, in a case where the charging sections 5 and the discharging sections 6 are identified from each other, the charging section 5 corresponding to the cell #i may be described as a charging section #i, and the discharging section 6 corresponding to the cell #i may be described as the discharging section #i. The cell monitoring section 7 monitors conditions of the cells 4, and generates cell module data indicating the conditions of the cells 4. In the present embodiment, the cell module data includes actually measured voltages of the cells 4 measured by the cell monitoring section 7. Hereinafter, the actually measured voltage of the cell #i is referred to as a measured cell voltage Vim.

The cell voltage calculating section 2 carries out an operation process to the measured cell voltages V1m to Vnm included in the cell module data, and calculates cell voltages V1 to Vn used for a control in the control section 3 (hereinafter to be referred to as "control cell voltages V1 to Vn"). Since the measured cell voltages V1m to Vnm that are the actually measured voltages are influenced by noises and by internal resistances of the cells 4, the control cell voltages V1 to Vn from which at least one of the influences is removed are calculated in the cell voltage calculating section 2 and are used for the control in the control section 3. As the operation carried out by the cell voltage calculating section 2, a filtering process of removing the noise and an operation process of obtaining open voltages of the cells 4 from the measured cell voltages V1m to Vnm are given, for example. It should be noted that when the influences of the measured noises and of the internal resistances of the cells 4 can be ignored, the measured cell voltages V1m to Vnm may be directly used as the control cell voltages V1 to Vn.

In response to the control cell voltage V1, the control section 3 supplies a charge command to the charging section 5 and a discharge command to the discharging section 6, and controls the charging and discharging of the cells 4 of the cell module 1. Specifically, in the case of trying to charge the cell #i, the control section 3 supplies a cell #i charge command to the charging section #i corresponding to the cell #i to control the charging section #i to start the charging. On the other hand, in the case of trying to discharge the cell #i, the control section 3 supplies a cell #i discharge command to the discharging section #i corresponding to the cell #i to control the discharging section #i to start the charging. The cells 4 to be charged and the cells 4 to be discharged are determined based on the control cell voltages V1 to Vn.

In the secondary cell control system 10 having the above-described configuration, (1) the cell balance control carried out by charging a part of the cells 4, (2) the cell balance control carried out by discharging a part of the cells 4, (3) the cell balance control carried out by charging a part of the cells 4 and discharging a part of the cells 4 can be separately and suitably used depending on the conditions of the cells 4. In this manner, a total of the number of cells 4 to be charged and the number of cells 4 to be discharged can be reduced, and thus the energy loss in the cell balance control can be reduced. It should be noted that logic to select the cells 4 to be discharged and the cells 4 to be charged will be described later in detail.

A configuration that the control section 3 controls a charge current and a discharge current of the cell 4 may be realized. FIG. 3B is a block diagram showing the secondary cell control system 10 having such a configuration. The control section 3 supplies a charge current command to instruct the charge current to the charging section 5, and supplies a discharge current command to instruct the discharge current for the discharging section 6. In FIG. 3B, the charge current command to instruct the charge current of the cell #i is described as the "cell #i charge current command", and the discharge current command to instruct the discharge current of the cell #i is described as the "cell #i discharge current command".

The control section 3 also can instruct a charge voltage instead of the charge current. In addition, in the case that the discharging in the discharging section 6 is carried out via a variable resistance, the control section 3 may instruct a resistance value of the variable resistance instead of the discharge current.

[Second Embodiment]

Figure 4A:
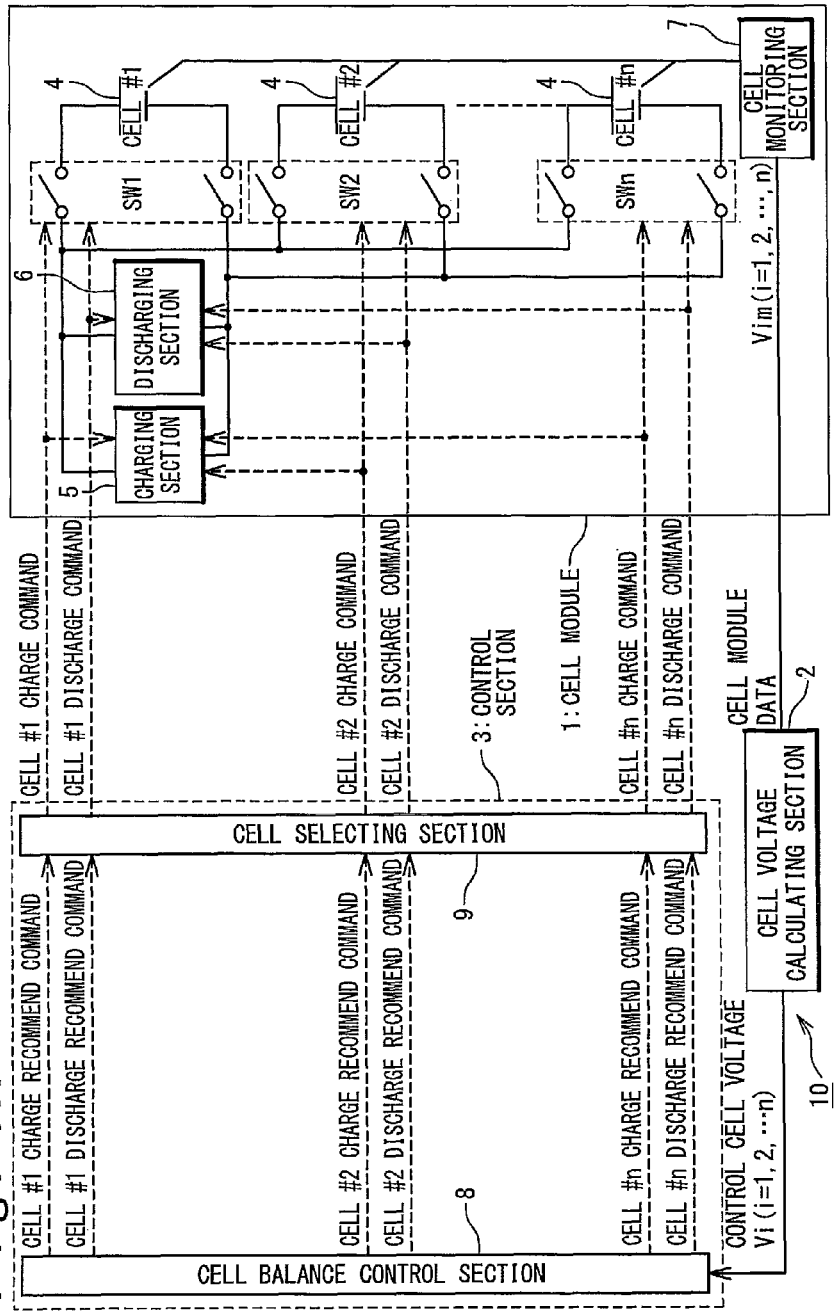
FIG. 4A is a block diagram showing a configuration of the secondary cell control system according to a second embodiment of the present invention.

FIG. 4A is a diagram showing a configuration of the secondary cell control system 10 according to a second embodiment. As in the configurations shown in FIGS. 3A and 3B, the configuration that one charging section 5 and one discharging section 6 are provided to each cell 4 is preferable in freely carrying out the charging and discharging to a desired one of the cells 4. However, the number of charging sections 5 and the number of discharging sections 6 become large. This causes increase in hardware scale of the secondary cell control system 10, and accordingly is not preferred from the cost.

In order to reduce the hardware scale of the secondary cell control system 10, a configuration is preferred in which the number of charging sections 5 and/or the number of discharging sections 6 are smaller than that of the cells 4. In the second embodiment, the number of charging sections 5 and the number of discharging sections 6 are smaller than those of the cells 4, and thus the hardware scale is intended to be reduced.

More specifically, in the configuration shown in FIG. 4A, a pair of the charging section 5 and the discharging section 6 is connected with the cells in parallel, and switches SW1 to SWn are provided between the pair of the charging sections 5 and the discharging sections 6 and the cells 4, respectively. When a switch SWi is turned on, the cell #i is electrically connected to the charging section 5 and discharging section 6, and the cell #i is set to be chargeable or dischargeable. It should be noted that the number of pairs of the charging section 5 and the discharging section 6 may be more than one. In this case, the plurality of cells 4 can be simultaneously charged or discharged.

It should be noted that the desired number of cells 4 cannot be necessarily charged and discharged simultaneously in the configuration shown in FIG. 4A. The number of cells 4 to be charged and discharged has to be selected based on the number of pairs of the charging section 5 and the discharging section 6.

In the secondary cell control system having the configuration shown in FIG. 4A, the selection of the cell 4 to be charged or discharged is carried out in a cell balance control section 8 and a cell selecting section 9 provided in the control section 3.

In response to the control cell voltages V1 to Vn, the cell balance control section 8 selects the cells 4 recommended to be charged and the cells 4 recommended to be discharged, and generates a charge recommend command to recommend to charge the cells 4 and a discharge recommend command to recommend to discharge the cells 4. In the cell balance control section 8, the number of charging sections 5 and the number of discharging sections 6 are not considered. When the number of charging sections 5 and the number of discharging sections 6 are sufficiently large, it is determined whether the cells 4 should be charged or discharged. Logic by which the cell balance control section 8 determines the cells 4 recommended to be charged and the cells 4 recommended to be discharged will be described later in detail. In FIG. 4A, the charge recommend command to recommend to charge the cell #i is described as a "cell #i charge recommend command", and the discharge recommend command to recommend to discharge the cell #i is described as a "cell #i discharge recommend command".

In response to the cell #1 to #n charge recommend commands and the cell #1 to #n discharge recommend commands, the cell selecting section 9 generates the charge commands and the discharge commands to instruct the actual charging and discharging operations. Logic in which the cell selecting section 9 determines the cell 4 that is actually charged or discharged will be described later in detail. In FIG. 4A, the charge command to instruct to actually charge the cell #i is described as the "cell #i charge command", and the discharge command to instruct to actually discharge the cell #i is described as the "cell #i discharge command".

The cell #1 to cell #n charge commands generated by the cell selecting section 9 are supplied to the charging section 5, and the cell #1 to cell #n discharge commands are supplied to the discharging section 6. In addition, the cell #i charge command and the cell #i discharge command are supplied to the switch SWi. When the charging of the cell #i is instructed by the cell #i charge command, the switch SWi is turned on and the charging section 5 is connected to the cell #i. Thus, the charging section 5 outputs the charge current in response to the cell #i charge command. In this operation, the cell #i is charged. On the other hand, when the discharging of the cell #i is instructed by the cell #i discharge command, the switch SWi is turned on and the discharging section 6 is connected to the cell #i. Thus, the discharging section 6 receives the discharge current from the cell #i in response to the cell #i discharge command. In this operation, the cell #i is discharged.

Figure 4B:
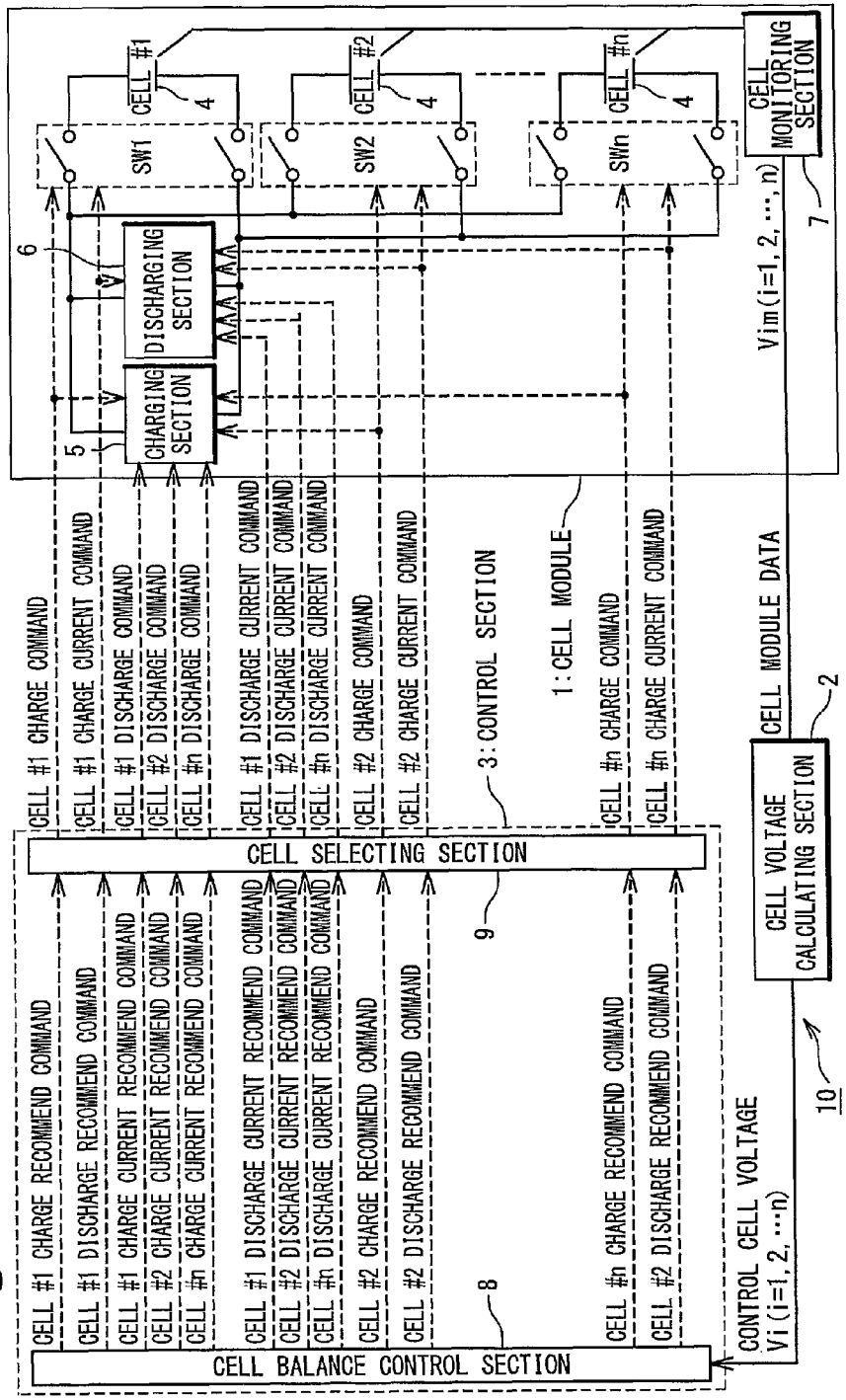
FIG. 4B is a block diagram showing another configuration of the secondary cell control system according to the second embodiment.

It should be noted that as shown in FIG. 4B, in the same manner as that of the configuration of FIG. 3B, a configuration may be realized in which the control section 3 controls the charge current and the discharge current for the cells 4. In this case, the cell balance control section 8 generates a charge current recommend command to instruct the charge current recommended for the cell 4; and a discharge current recommend command to instruct the discharge current recommended for the cell 4. In FIG. 4B, the charge current recommend command to recommend the charge current of the cell #i is described as a "cell #i charge current recommend command", and the discharge current recommend command to recommend the discharge current of the cell #i is described as a "cell #i discharge current recommend command". The cell selecting section 9 supplies as the charge current command to the charging section 5, the charge current recommend command, corresponding to the cell 4 to which the charging has been actually instructed, of the charge current recommend commands supplied to the cell selecting section 9. Also, the cell selecting section 9 supplies as the discharge current command to the discharging section 6, the discharge current recommend command, corresponding to the cell 4 to which the discharging has been actually instructed, of the discharge current recommend commands supplied to the cell selecting section 9. The control section 3 can instruct a charge voltage instead of the charge current. In addition, when the discharging is carried out via a variable resistance in the discharging section 6, the control section 3 may instruct a resistance value of the variable resistance instead of the discharge current.

[Third Embodiment]

Figure 5A:
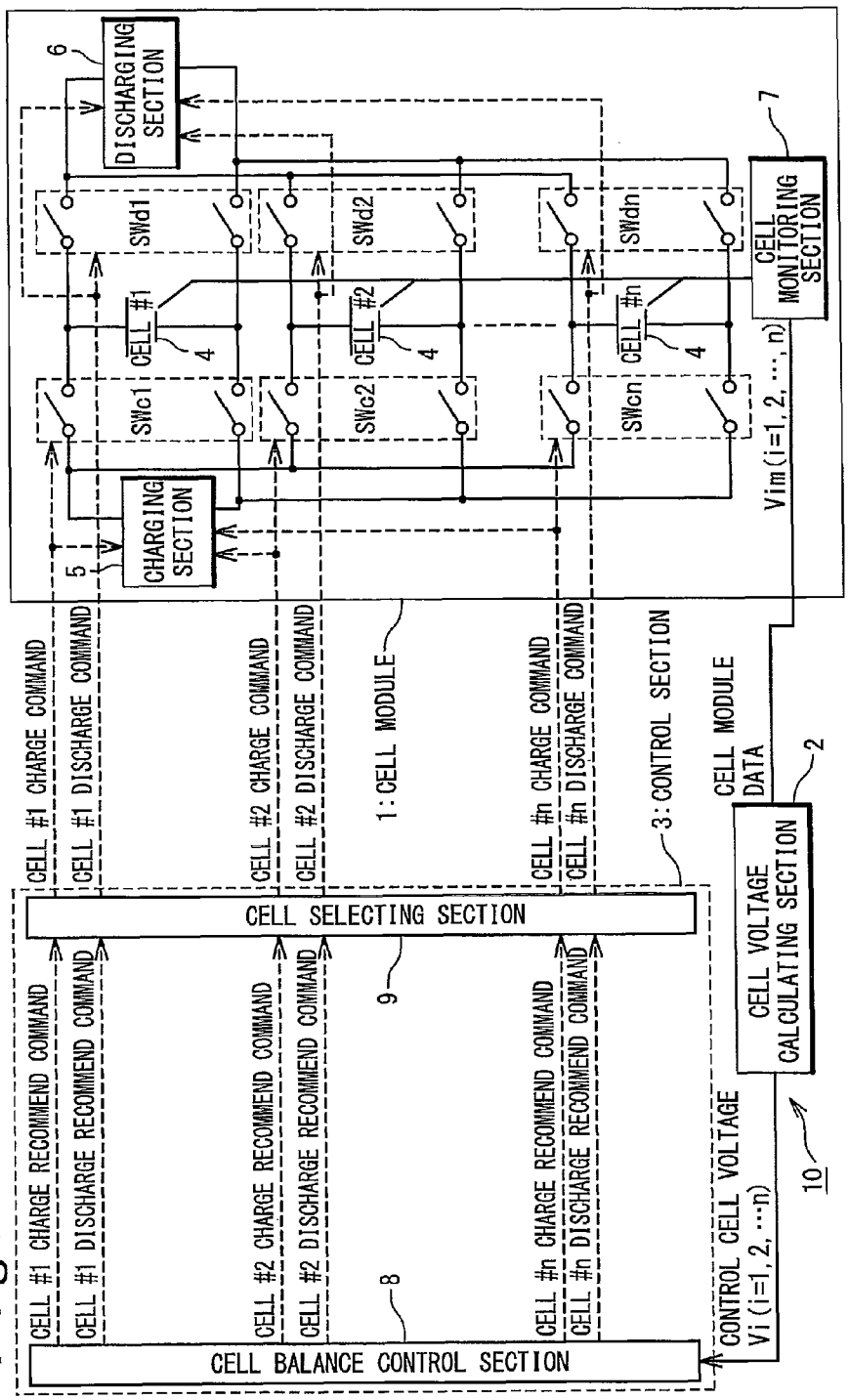
FIG. 5A is a block diagram showing a configuration of the secondary cell control system according to a third embodiment of the present invention.

FIG. 5A is a block diagram showing a configuration of the secondary cell control system 10 according to a third embodiment. The configurations shown in FIGS. 4A and 4B are preferred for reduction of a hardware amount. However, since the charging section 5 and the discharging section 6 are directly connected to each other in parallel, the charging and the discharging cannot be carried out independently. In the configuration of the third embodiment shown in FIG. 5A, switches SWc1 to SWcn are connected between the charging section 5 and the cells #i to #n, respectively, and switches SWd1 to SWdn are connected between the discharging section 6 and the cells #i to #n, respectively. Accordingly, the charging and the discharging can be carried out independently. That is, while charging a certain cells 4 by the charging sections 5, another cell 4 can be discharged by the discharging sections 6.

Specifically, in the configuration of FIG. 5A, the cell #1 to cell #n charge commands generated by the cell selecting section 9 are supplied to the charging section 5, and the cell #1 to cell #n discharge commands are supplied to the discharging section 6. In addition, the cell #1 charge command is supplied to the switch SWci, and the cell #i discharge command is supplied to the switch SWdi. When the charging of the cell #i is instructed by the cell #i charge command, the switch SWci is turned on and the charging section 5 is connected to the cell #i. Thus, the charging section 5 outputs the charge current in response to the cell #i charge command. In this operation, the cell #i is charged. On the other hand, when the discharging of the cell #i is instructed by the cell #i discharge command, the switch SWdi is turned on and the discharging section 6 is connected to the cell #i. Thus, the discharging section 6 receives the discharge current from the cell #i in response to the cell #i discharge command. In this operation, the cell #i is discharged.

It should be noted that in FIG. 5A, the configuration is shown in which each of the charging section 5 and the discharging section 6 is single. However, the number of charging sections 5 and/or the number of discharging sections 6 may be more than one. In this case, some of the charging sections 5 and discharging sections 6 may not be provided in one-on-one correspondence with cells 4, while at least one of each of the charged sections 5 and discharging sections 6 may be configured as shown in FIG. 5A. In addition, the number of charging sections 5 and the number of discharging sections 6 may be different. Providing the plurality of charging sections 5, the plurality of cells 4 can be simultaneously charged, and additionally providing the plurality of discharging sections 6, the plurality of cells 4 can be simultaneously discharged.

Figure 5B:
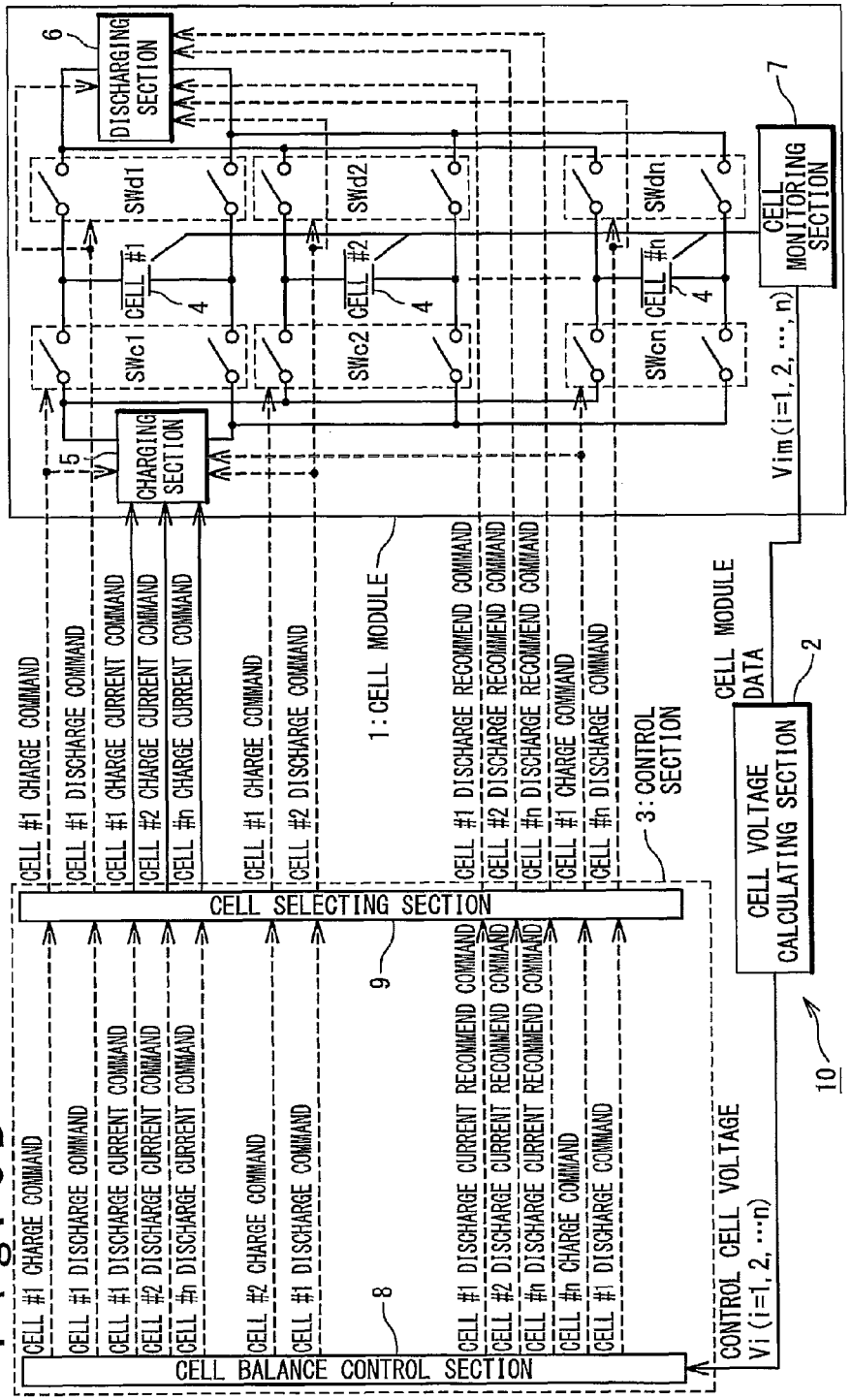
FIG. 5B is a block diagram showing another configuration of the secondary cell control system according to the third embodiment.

In addition, as shown in FIG. 5B, in the same manner as that of the configuration of FIG. 4B, a configuration may be realized in which the control section 3 controls the charge current and the discharge current for the cell 4. The cell balance control section 8 generates a charge current recommend command to instruct the charge current recommended for the cell 4, and a discharge current recommend command to instruct the discharge current recommended for the cell 4. The cell selecting section 9 supplies as the charge current command to the charging section 5, the charge current recommend command corresponding to the cell 4 to which the charging has been actually instructed, of the charge current recommend commands supplied to the cell selecting section 9. The cell selecting section 9 supplies as the discharge current command to the discharging section 6, the discharge current recommend command, corresponding to the cell 4 to which the discharging has been actually instructed, of the discharge current recommend commands supplied to the cell selecting section 9. The control section 3 can instruct a charge voltage instead of the charge current. In addition, when the discharging is carried out through a variable resistance in the discharging section 6, the control section 3 may indicate a resistance value of the variable resistance instead of the discharge current.

[Fourth Embodiment]

FIG. 6A is a block diagram showing a configuration of the secondary cell control system 10 according to a fourth embodiment. In the configuration shown in FIG. 6A, while the charging section 5 is connected to each of the cells 4, the discharging section 6 is connected to the cells #1 to #n via the switches SWd1 to SWdn. In this configuration, the number of charging sections 5 cannot be reduced but the number of discharging sections 6 can be reduced so as to be smaller than that of the cells 4, which is preferred to reduce the hardware scale of the secondary cell control system 10.

In the configuration of FIG. 6A, the cell #1 to cell #n charge commands generated by the cell selecting section 9 are supplied to the charging sections #1 to #n, and the cell #1 to cell #n discharge commands are supplied to the discharging section 6. In addition, the cell #i discharge command is supplied to the switch SWdi. When the charging of the cell #i is instructed by the cell #i charge command, the charging section #i outputs the charge current in response to the cell #i charge command, the cell #i is charged. On the other hand, when the discharging of the cell #i is instructed by the cell #i discharge command, the switch SWdi is turned on and the discharging section 6 is connected to the cell #i. Thus, the discharging section 6 receives the discharge current from the cell #i in response to the cell #i discharge command. In this operation, the cell #i discharged.

It should be noted that in FIG. 6A, the configuration is illustrated in which the number of discharging sections 6 is one. However, the number of discharging sections 6 may be plural. In this case, some of the discharging sections may be provided in one-on-one correspondence with a cell #i, while at least one discharging section 6 may be configured as shown in FIG. 6A. Also, the plurality of cells 4 can be simultaneously discharged.

Figure 6B:
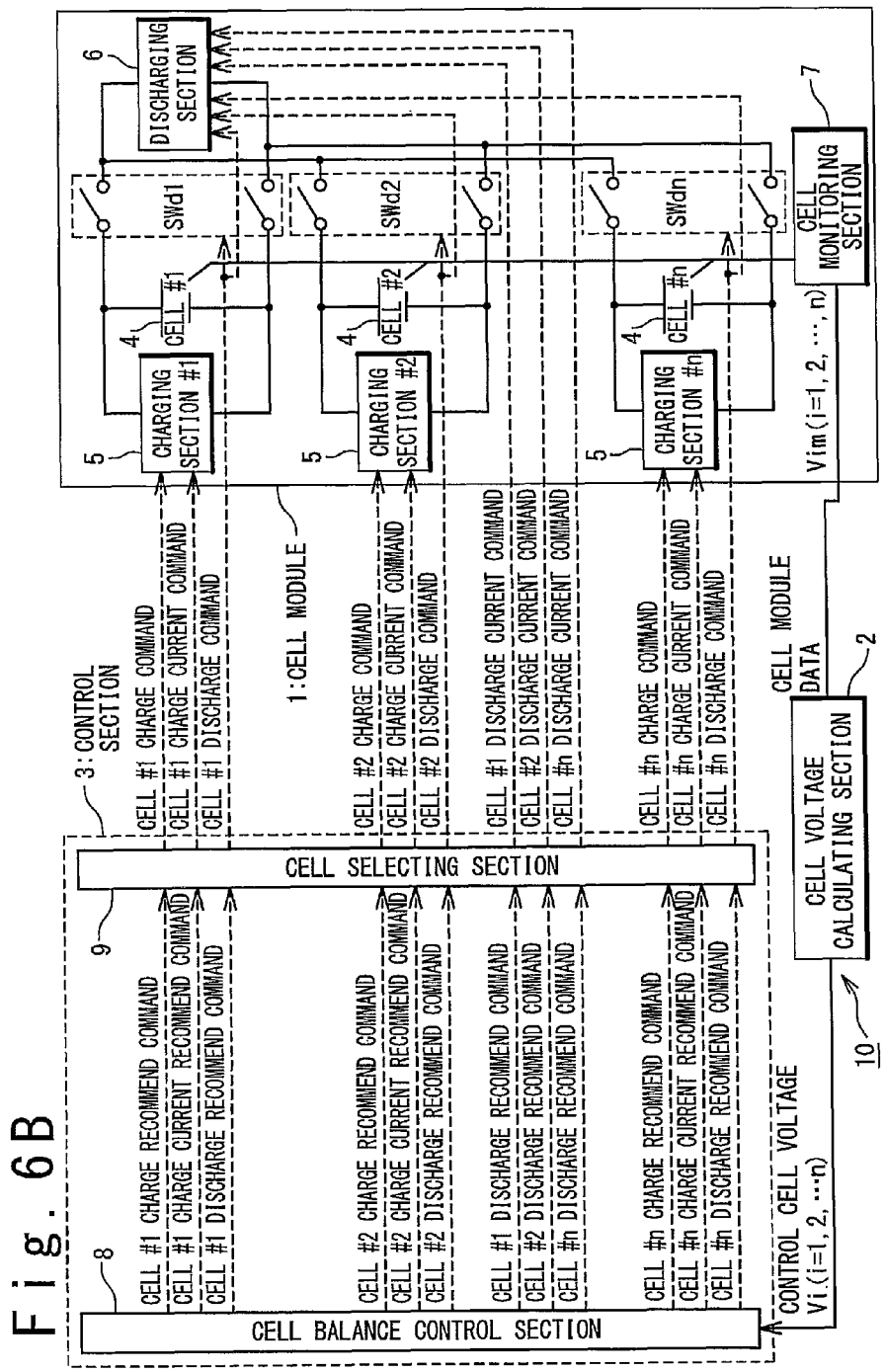
FIG. 6B is a block diagram showing another configuration of the secondary cell control system according to the fourth embodiment.

In addition, as shown in FIG. 6B, in the same manner as those of the configurations of FIG. 3B to FIG. 5B, a configuration may be realized in which the control section 3 controls the charge current and the discharge current for the cell 4. The control section 3 supplies the charge current commands to the charging sections 5 to instruct the charge currents, respectively, and supplies the discharge current commands to the respective discharging sections 6 to instruct the discharge currents. The control section 3 is also able to instruct a charge voltage instead of the charge current. In addition, when the discharging is carried out via a variable resistance in the discharging section 6, the control section 3 may indicate a resistance value of the variable resistance instead of the discharge current.

[Fifth Embodiment]

Figure 7A:
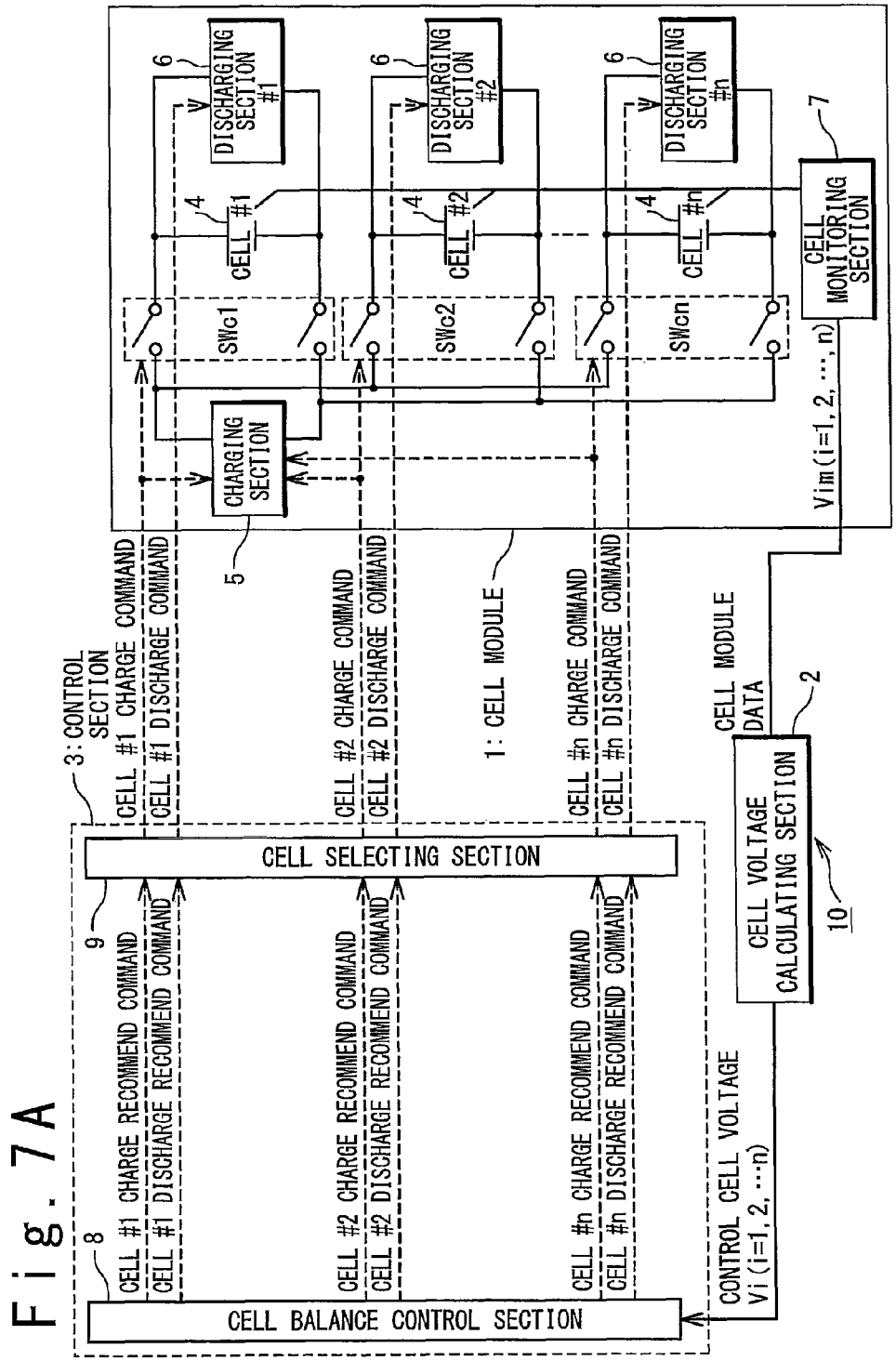
FIG. 7A is a block diagram showing a configuration of the secondary cell control system according to a fifth embodiment of the present invention.

FIG. 7A is a block diagram showing a configuration of the secondary cell control system 10 according to a fifth embodiment. In a configuration shown in FIG. 7A, while the discharging sections 6 are respectively connected to the cells 4, the charging section 5 is connected to the cells #1 to #n via the switches SWc1 to SWcn. In this configuration, the number of discharging sections 6 cannot be reduced but the number of charging sections 5 can be reduced to be smaller than that of the cells 4, which is preferred to reduce the hardware scale of the secondary cell control system 10. Generally, while the discharging section 6 can be realized by a switch and a resistance element so that the cost is low, the charging section 5 requires a complicated circuit so that the cost is high. Thus, the configuration of FIG. 7A is a practical configuration having few disadvantages in cost, increasing the number of cells 4 that are able to simultaneously discharge.

In the configuration of FIG. 7A, the cell #1 to cell #n charge commands generated by the cell selecting section 9 are supplied to the charging section 5, and the cell #1 to cell #n discharge commands are supplied to the discharging sections #1 to #n. In addition, the cell #i charge command is supplied to the switch SWci. When the charging of the cell #i is instructed by the cell #i charge command, the switch SWci is turned on and the charging section 5 is connected to the cell #i. Thus, the charging section 5 outputs the charge current in response to the cell #i charge command. In this operation, the cell #i is charged. On the other hand, when the discharging of the cell #i is instructed by the cell #i discharge command, the discharging section #i receives the discharge current from the cell #i in response to the cell #i discharge command. Thus, the cell #i is discharged.

It should be noted that in FIG. 7A, the configuration is illustrated in which the number of charging sections 5 is one. However, the number of charging sections 5 may be plural. In this case, some of the charging sections may be provided in one-on-one correspondence with a cell #i, while at least one charging section 6 may be configured as shown in FIG. 7A. Also, the plurality of cells 4 can be simultaneously charged.

Figure 7B:
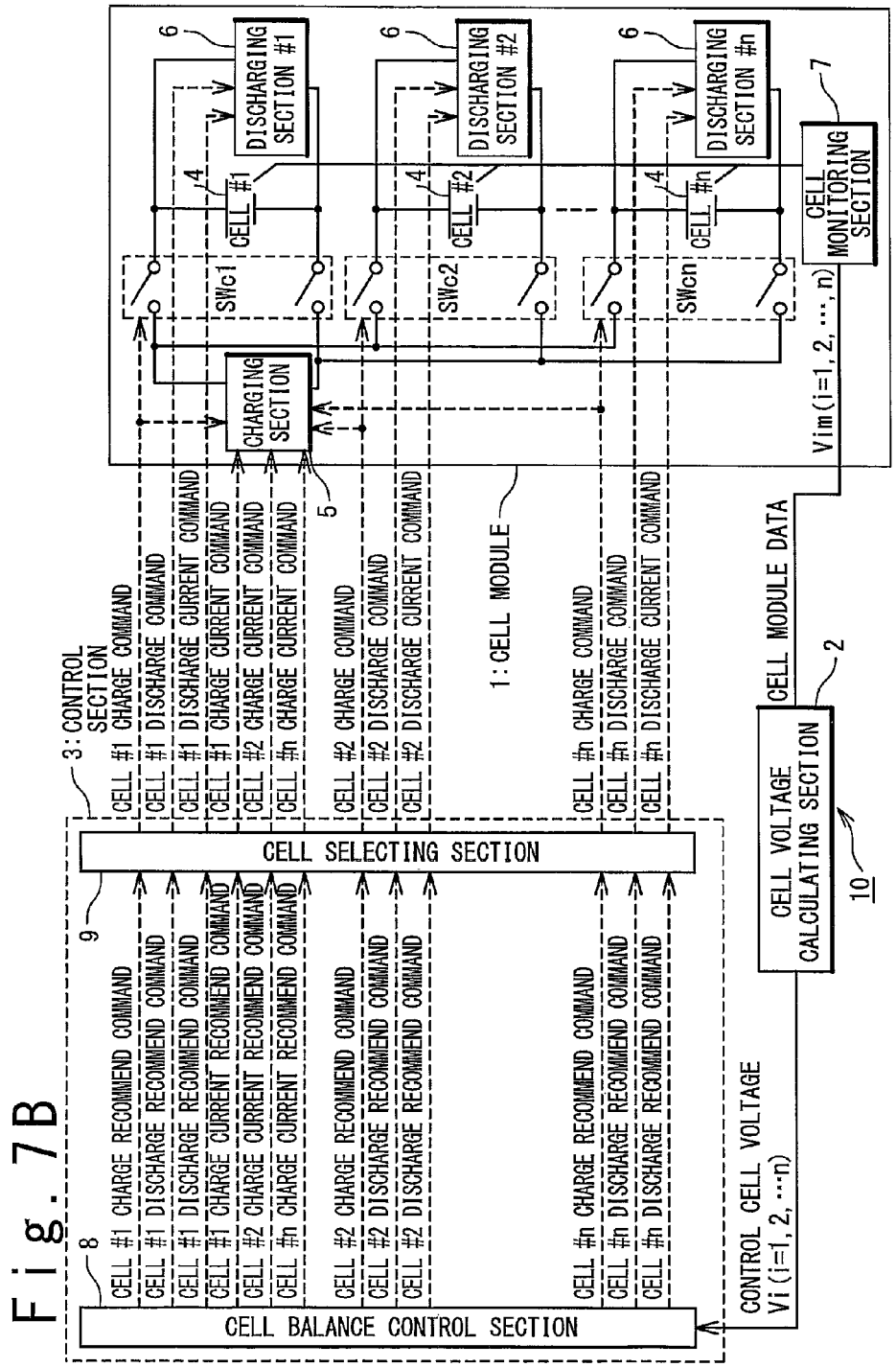
FIG. 7B is a block diagram showing another configuration of the secondary cell control system according to the fifth embodiment.

In addition, as shown in FIG. 7B, in the same manner as those of the configurations of FIGS. 3B to 6B, a configuration may be realized in which the control section 3 controls the charge current and the discharge current for the cell 4. The control section 3 supplies the charge current commands to the charging sections 5 to instruct the charge currents, and supplies the discharge current commands to the discharging sections 6 to instruct the discharge currents. The control section 3 may also instruct a charge voltage instead of the charge current. In addition, when the discharging is carried out through a variable resistance in the discharging section 6, the control section 3 may instruct a resistance value of the variable resistance instead of the discharge current.

2. Selection of Cell that should be Charged or Discharged

In any configurations of the secondary cell control system 10 according to the above-mentioned first to fifth embodiments, a selection method of the cell 4 to be charged or discharged influences the reduction of the energy loss and the uniformity of the cell voltages. As the number of cells 4 to be charged or discharged becomes smaller, the energy loss is reduced more. However, as the number of cells 4 to be charged or discharged becomes more, the uniformity of the cell voltages is improved more. In the following description, four preferable selection methods of the cells 4 to be charged or discharged are proposed.

(First Selection Method)

FIGS. 8A to 8D are diagrams showing a first selection method of the cells 4 to be charged and the cells 4 to be discharged. In the first selection method, a target cell voltage Vavr is determined, and the cell 4 to be charged or discharged is determined by using the target cell voltage Vavr. In one example, as the target cell voltage Vavr, an average value or a center value (a median) of the control cell voltages V1 to Vn of the cells #1 to #4 is used. In addition, the target cell voltage Vavr may be a preset value and a set value given from the outside.

In the first selection method, a threshold value is determined which is used to determine the cells 4 to be charged and the cells 4 to be discharged by using the determined target cell voltage Vavr. When the control cell voltage Vi of a certain cell #i is larger by a predetermined value Vta or more (or exceeding the predetermined value Vta) than the target cell voltage Vavr, the cell #i is discharged. On the other hand, when the control cell voltage Vi is smaller by a predetermined value Vtb or more (or exceeding the predetermined value Vtb) than the target cell voltage Vavr, the cell #i is charged. That is, when the control cell voltage Vi is Vavr+Vta or more (or when the control cell voltage Vi exceeds Vavr+Vta), the cell #i is discharged, and when the control cell voltage Vi is Vavr−Vtb or less (or when the control cell voltage Vi is less than Vavr+Vta), the cell #i is charged. When the control cell voltage Vi is in a range between the voltage Vavr−Vtb and the voltage Vavr+Vta, the cell #i is neither charged nor discharged.

Figure 8A:
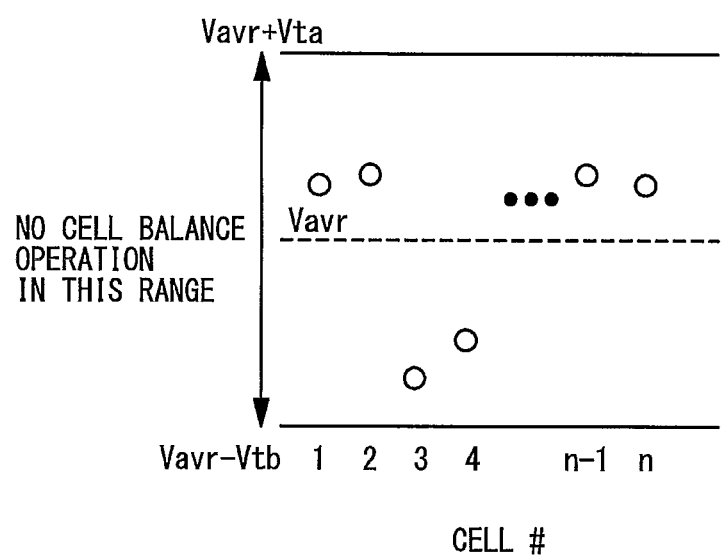
FIG. 8A is a diagram schematically showing a first selection method of selecting a cell to be charged or discharged.
Figure 8B:
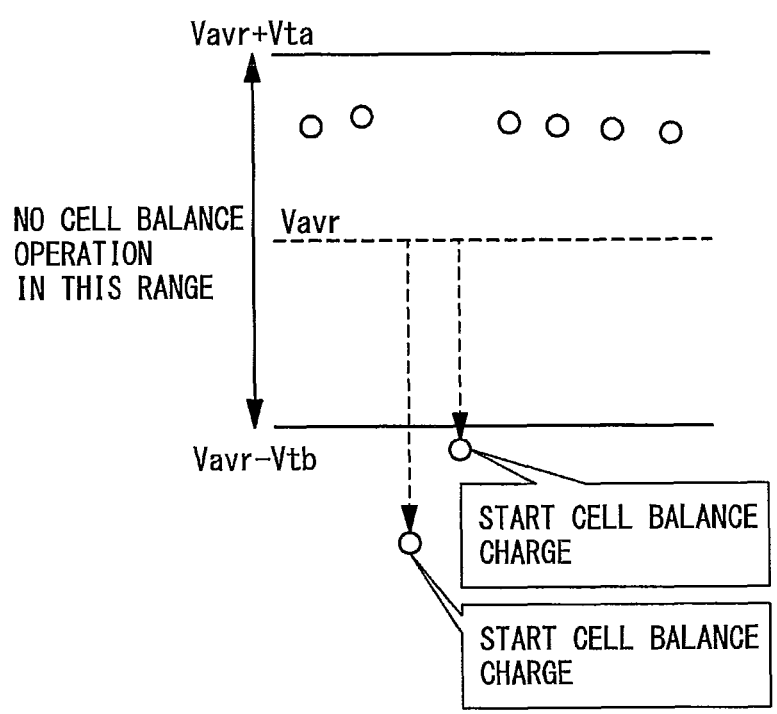
FIG. 8B is a diagram schematically showing the first selection method for selecting the cell to be charged or discharged.
Figure 8C:
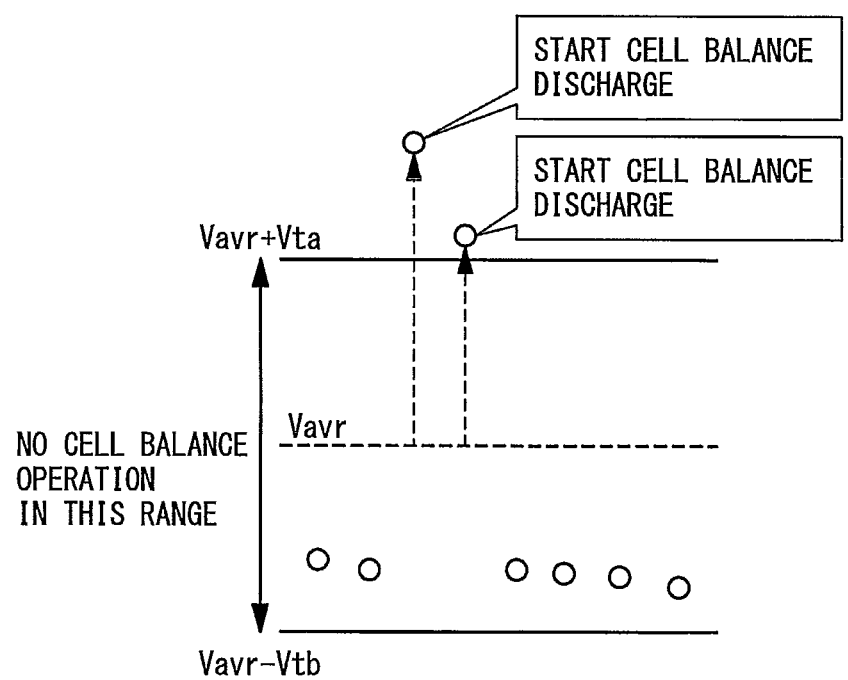
FIG. 8C is a diagram schematically showing the first selection method for selecting the cell to be charged or discharged.

FIGS. 8A to 8D show examples of control of the charging and discharging in the first selection method. FIG. 8A shows the charging and discharging control when the control cell voltages of all the cells 4 is in a range between the voltage Vavr−Vtb and the voltage Vavr+Vta. In this case, any of the cells 4 is neither charged nor discharged. FIG. 8B shows the charging and discharging control when the control cell voltages of two particular cells 4 falls below the voltage Vavr−Vtb. In this case, the two cells 4 are charged. FIG. 8C shows the charging and discharging control when the control cell voltages of two particular cells 4 exceeds the voltage Vavr+Vta. In this case, the two cells 4 are discharged. FIG. 8D shows the charging and discharging control when the control cell voltage of the particular cell 4 exceeds the voltage Vavr+Vta and the control cell voltage of the particular cell 4 falls below the voltage Vavr−Vtb. In this case, the cell 4 whose control cell voltage exceeds the voltage Vavr+Vta is charged and the cell 4 whose control cell voltage falls below the voltage Vavr−Vtb is discharged.

Figure 9A:
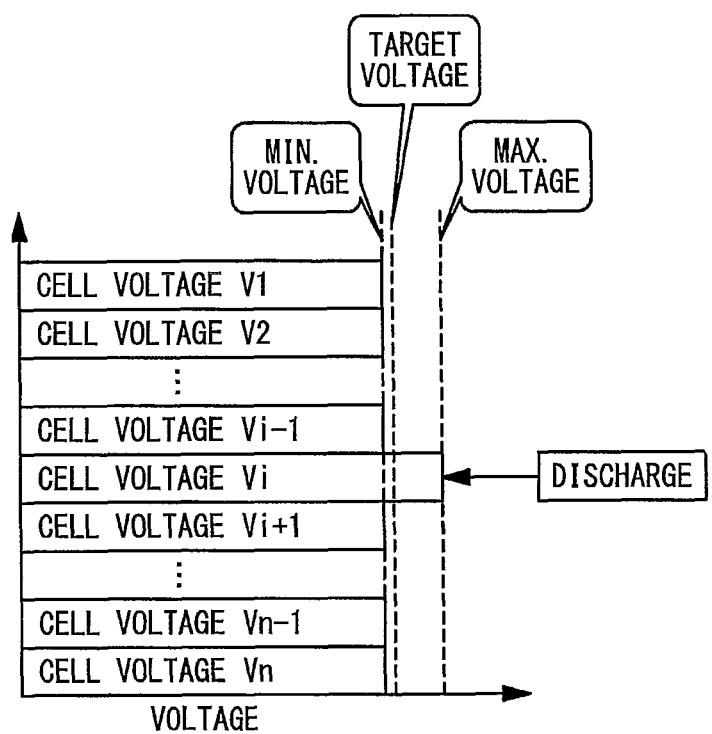
FIG. 9A is a schematic diagram showing the cell balance control according to the first selection method.
Figure 9B:
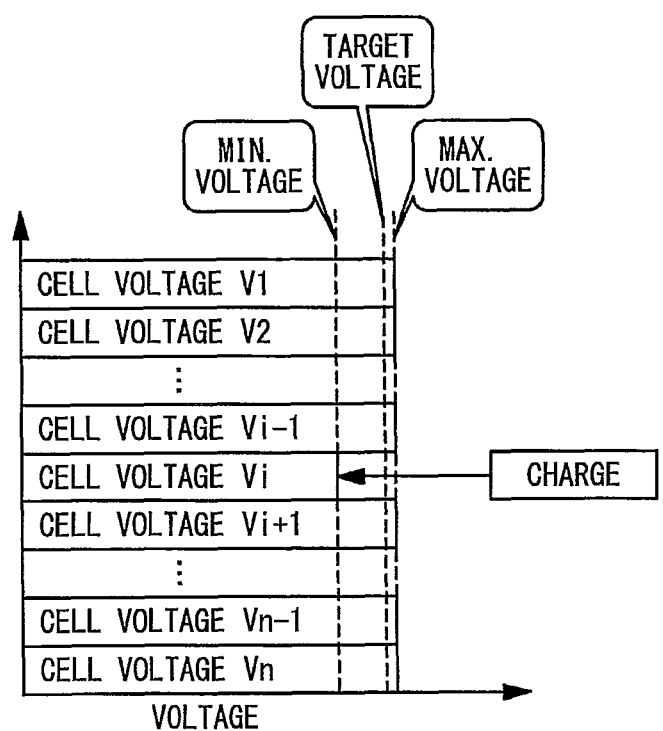
FIG. 9B is a schematic diagram explaining the cell balance control according to the first selection method.
Figure 9C:
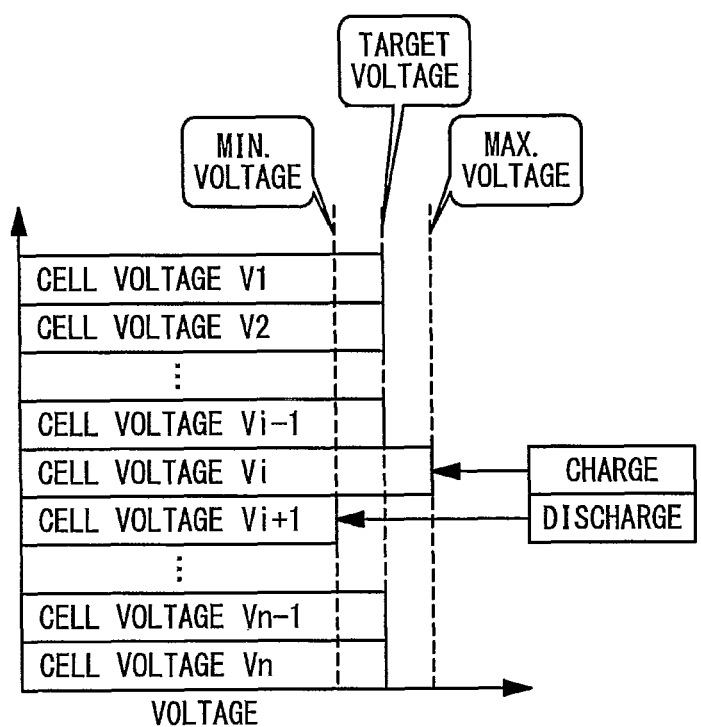
FIG. 9C is a schematic diagram explaining the cell balance control according to the first selection method.

In this method, as shown in FIG. 9A, when the control cell voltage of the particular cell 4 (of the cell #i in FIG. 9A) is greatly high, the cell 4 is discharged. Additionally, as shown in FIG. 9B, when the control cell voltage of the particular cell 4 is greatly low, the cell 4 is charged. In addition, as shown in FIG. 9C, when the cell 4 whose control cell voltage is greatly high and the cell 4 whose control cell voltage is greatly low are both present, the cell 4 having the high control cell voltage is discharged, and the cell 4 having the low control cell voltage is charged.

As described above, in the first selection method, the number of cells 4 to be charged or discharged is reduced and the energy loss is effectively reduced by separately and suitably performing the charging and discharging control in order to control the cell balance.

Figure 10:
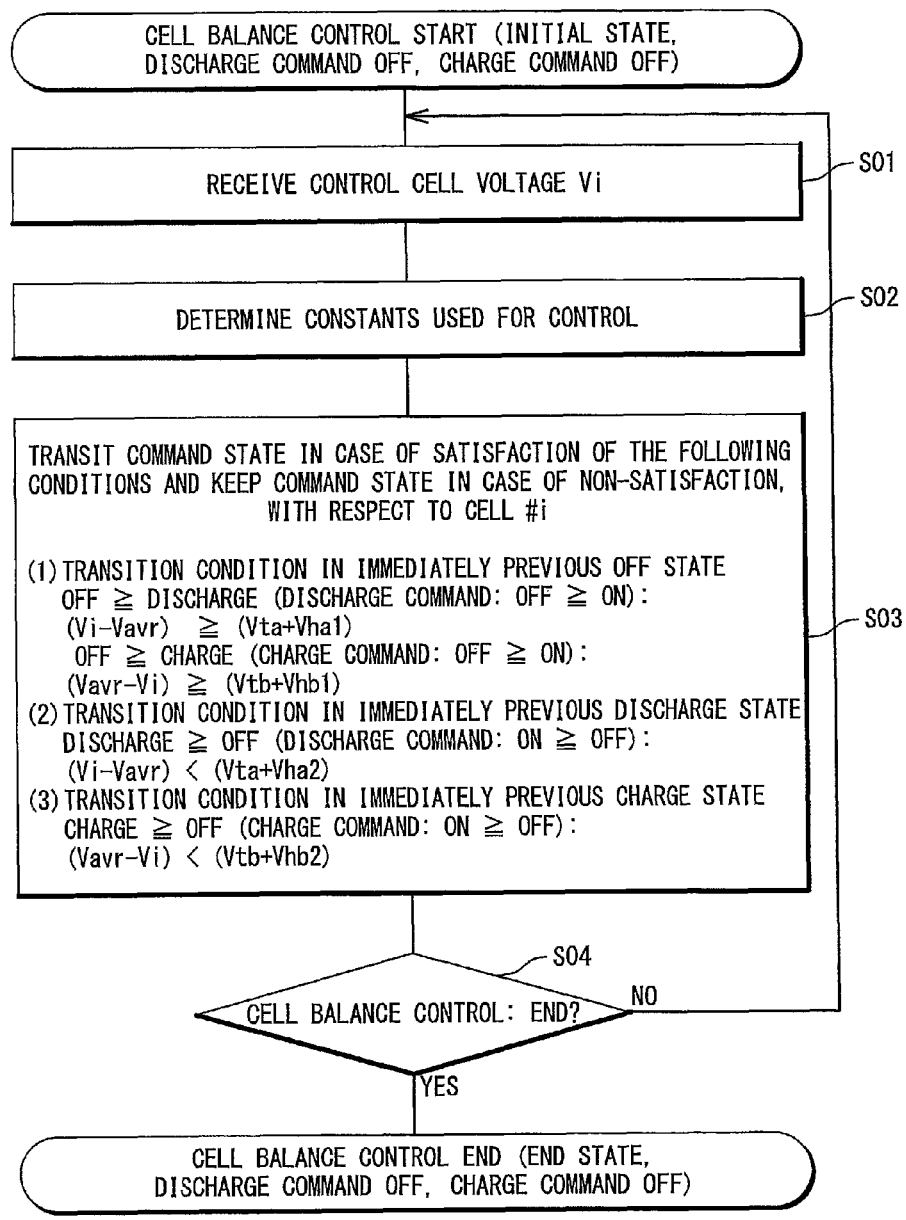
FIG. 10 shows a flowchart in an operation of the first selection method.

In order to improve stability of the operation, it is effective to apply hysteresis to the charging and discharging control by making a control cell voltage when the charging or the discharging starts from a control cell voltage when the charging or the discharging ends different from each other. FIG. 10 is a flowchart showing an operation of the control section 3 for realizing the above-mentioned control. In an initial state, it is supposed that any of the cells #1 to #n have neither been charged nor discharged at all.

When a control cycle of the cell balance control starts, the control section 3 obtains the control cell voltages V1 to Vn of the cells 4 (step S01). Moreover, a constant used for the control is determined (step S02). More specifically, in the first selection method, the target cell voltage Vavr is determined from the control cell voltages V1 to Vn As described above, as the target cell voltage Vavr, an average value or median of the control cell voltages V1 to Vn of the cells #1 to #4 can be used. In addition, the target cell voltage Vavr may be a preset value and a set value provided from the outside.

Subsequently, start and end of the charging/discharging of the respective cells 4 are controlled (step S03). The start and end of the charging/discharging of the cell #i is controlled in the following manner.

(1) A Case where the Cell #i is not Currently Charged and Discharged:

In this case, the discharging of the cell #i is started when the following equation is satisfied;

$$Vi - Vavr \geq Vta + Vha1 \quad (1a).$$

Here, Vta is a predetermined determination threshold voltage, and Vha1 is a predetermined hysteresis voltage. Note that the charging of the cell #i is started when the following equation is satisfied;

$$Vavr - Vi \geq Vtb + Vhb1 \quad (1b).$$

Here, Vtb is a predetermined determination threshold voltage, and Vhb1 is a predetermined hysteresis voltage.

(2) A Case where the Cell #i is Currently Discharged:

In this case, the discharging is ended when the following equation is satisfied;

$$Vi - Vavr < Vta + Vha2 \quad (2).$$

Here, Vha2 is a predetermined hysteresis voltage. By setting the hysteresis voltage Vha1 of the equation (1a) and the hysteresis voltage Vha2 of the equation (2) so as to satisfy the following condition;

$$Vha1 > Vha2 \geq 0,$$

the hysteresis is given to the start and end of the discharging to intend to stabilize the discharging.

(3) A Case where the Cell #i is Currently Charged:

In this case, the charging is ended when the following equation is satisfied;

$$Vavr - Vi < Vta + Vha2 \quad (3).$$

Here, Vha2 is a predetermined hysteresis voltage. By setting the hysteresis voltage Vhb1 of the equation (1b) and the hysteresis voltage Vhb2 of the equation (3) so as to satisfy the following condition;

$$Vhb1 > Vhb2 \geq 0,$$

the hysteresis is given to the start and end of the charging to intend to stabilize the charging.

The charging and discharging control of the cell 4 is carried out by repeating the above-mentioned steps S01 to S03 at an optional interval. When the end of the cell balance control is instructed (step S04), the cell balance control is ended. Thus, the charging and discharging of all the cells 4 are stopped. In order to further improve the stability of the control, changing of the charging and discharging conditions of the cells 4 may be prohibited for a predetermined time τ after the charging and discharging conditions of the cells 4 are changed.

It should be noted that in the above-mentioned equations (1a), (1b), (2), and (3), while an equality sign and an inequality sign are given in the equations (1a) and (1b), the equality sing is not given to the equations (2) and (3). However, existence of the equality sign can be optionally determined in the equations (1a), (1b), (2), and (3). In addition, when the hysteresis is not required to be given to the start and end of the discharging, the above-mentioned hysteresis voltages Vha1 and Vha2 may be set to the same value (typically 0). In the same manner, when the hysteresis is not required to be given to the start and end of the charging, the above-mentioned hysteresis voltages Vhb1 and Vhb2 may be set to the same value (typically 0).

When the discharge current and the charge current can be controlled, it is preferred for the charge current or the discharge current for the cell #i to be controlled based on a difference between the control cell voltage Vi and the target cell voltage Vavr. For example, it is preferred for the discharge current Idi and the charge current Ici to be determined as function values of the following functions Fd and Fc:

$$Idi = Fd((Vi - Vavr) - (Vta + Vha2)),$$

$$Ici = Fc((Vavr - Vi) - (Vta + Vhb2)).$$

Here, Fd(x) and Fc(x) are functions that monotonously increase (in a broad sense) with respect to x. Instead of calculating the discharge current Idi and the charge current Ici by using the functions Fd and Fc, a table showing relations between the control cell voltage Vi and the target cell voltage Vavr; and the discharge current Idi and the charge current Ici may be prepared.

(Second Selection Method)

FIGS. 11A to 11D are diagrams showing a second selection method of selecting the cells 4 to be charged/discharged. In the first selection method, when the control cell voltage Vi is out of a range between the voltage Vavr−Vtb and the voltage Vavr+Vta, the charging or discharging is carried out without any condition. However, even if the control cell voltage of a certain cell 4 is out of the range between the voltage Vavr−Vtb and the voltage Vavr+Vta, the charging is discharging is not necessarily required to be carried out when the differences from the control cell voltages of other cells 4 are small. As described above, since the reduction of the number of cells 4 to be charged or discharged is effective to reduce the energy loss, the first selection method is improved in the second selection method as follows.

In one example, differences between the control cell voltage of a particular cell 4 and the control cell voltages of other cells 4 are determined by using the maximum value Vmax and the minimum value Vmin of the control cell voltage. That is, when the control cell voltage Vi is Vavr+Vta or more (or exceeds Vavr+Vta) and is Vmin+Vtc or more (or exceeds Vmin+Vtc), the cell #i is discharged. Here, Vavr is the above-mentioned target cell voltage, Vmin is the minimum value of the control cell voltages V1 to Vn, and Vta and Vtc are the predetermined determination threshold voltages.

On the other hand, when the control cell voltage Vi is Vavr−Vtb or less (or is lower than Vavr−Vtb) and is Vmax−Vtc or less (or is lower than Vmax−Vtc), the cell #i is charged. Here, Vmax is the maximum value of the control cell voltages V1 to Vn, and Vtb and Vtc are the predetermined determination threshold voltages.

When the two conditions are not satisfied, both of the charging and the discharging are not carried out.

Figure 11A:
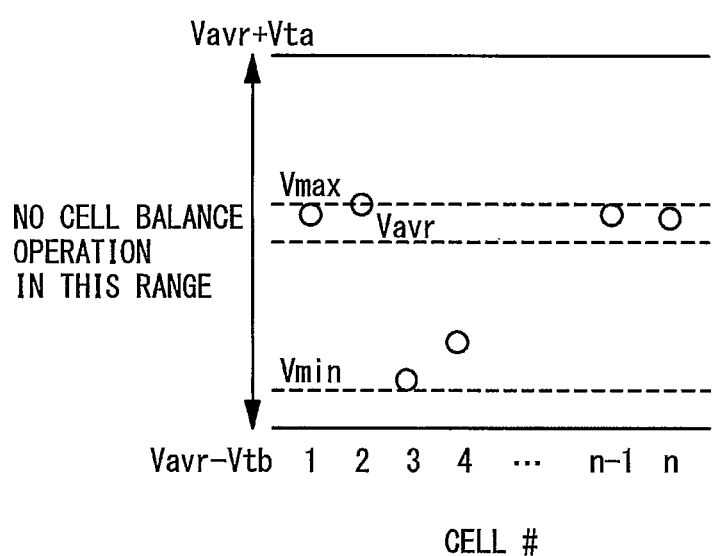
FIG. 11A is a diagram schematically showing a second selection method for selecting a cell to be charged or discharged.

In the example, the above-mentioned determination threshold voltage Vtc is set to Vta+Vtb. FIGS. 11A to 11D show examples of the control of charging and discharging in this case. FIG. 11A shows the charging and discharging control when the control cell voltages of all the cells 4 is in a range between the voltage Vavr−Vtb and the voltage Vavr+Vta, and in this case, any cells 4 will neither be charged nor discharged.

Figure 11B:
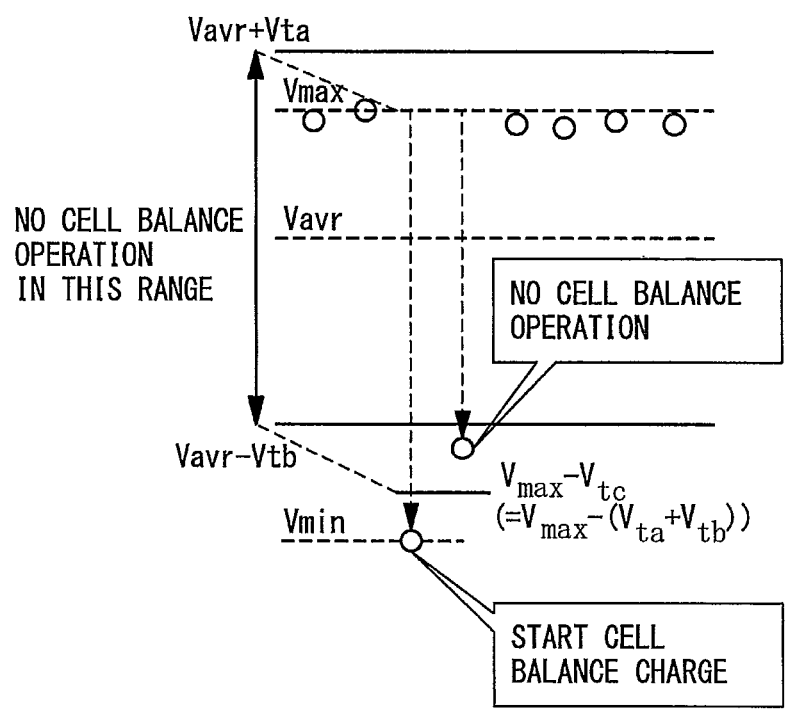
FIG. 11B is a diagram schematically showing the second selection method for selecting the cell to be charged or discharged.

FIG. 11B shows the charging and discharging control when the control cell voltages of two particular cells 4 fall below the voltage Vavr−Vtb. The control cell voltage of one of the two cells 4 falls below the voltage Vmax−Vtc and the control cell voltage of the other exceeds the voltage Vmax−Vtc. In this case, only the cell 4 whose control cell voltage falls below the voltage Vmax−Vtc is charged.

Figure 11C:
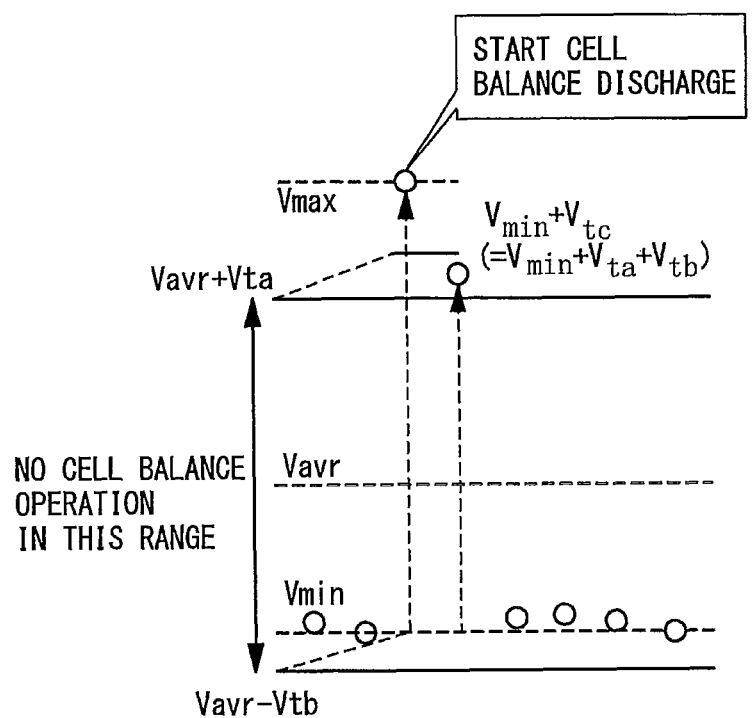
FIG. 11C is a diagram schematically showing the second selection method for selecting the cell to be charged or discharged.

FIG. 11C shows the charging and discharging control when the control cell voltages of two particular cells 4 exceed the voltage Vavr+Vta. The control cell voltage of one of the two cells 4 exceeds the voltage Vmin+Vtc and that of the other falls below the voltage Vmax+Vtc. In this case, only the cell 4 whose control cell voltage exceeds the voltage Vmax+Vtc is discharged.

Figure 11D:
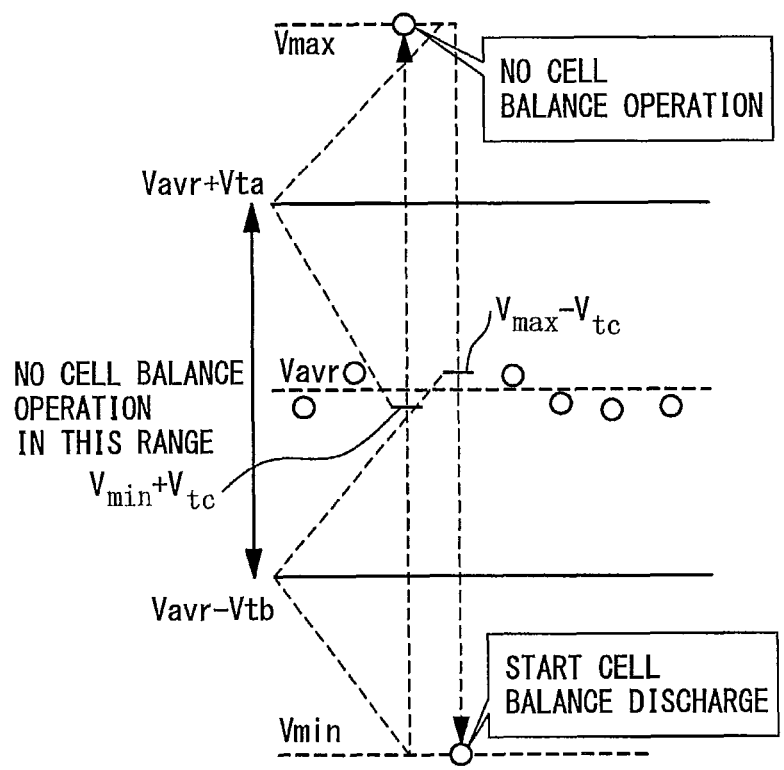
FIG. 11D is a diagram schematically showing the second selection method for selecting the cell to be charged or discharged.

FIG. 11D shows the charging and discharging control when the control cell voltage of one particular cell 4 exceeds the voltage Vavr+Vta and the control cell voltage of another particular cell 4 falls below the voltage Vavr−Vtb. In this case, since the control cell voltage exceeding the voltage Vavr+Vta automatically exceeds the voltage Vmin+Vtc, the cell 4 whose control cell voltage exceeds the voltage Vavr+Vta is discharged. In the same manner, since the control cell voltage falling below the voltage Vavr−Vtb automatically falls below the voltage Vmax−Vtc, the cell 4 whose control cell voltage falls below the voltage Vavr−Vtb is charged.

Figure 12:
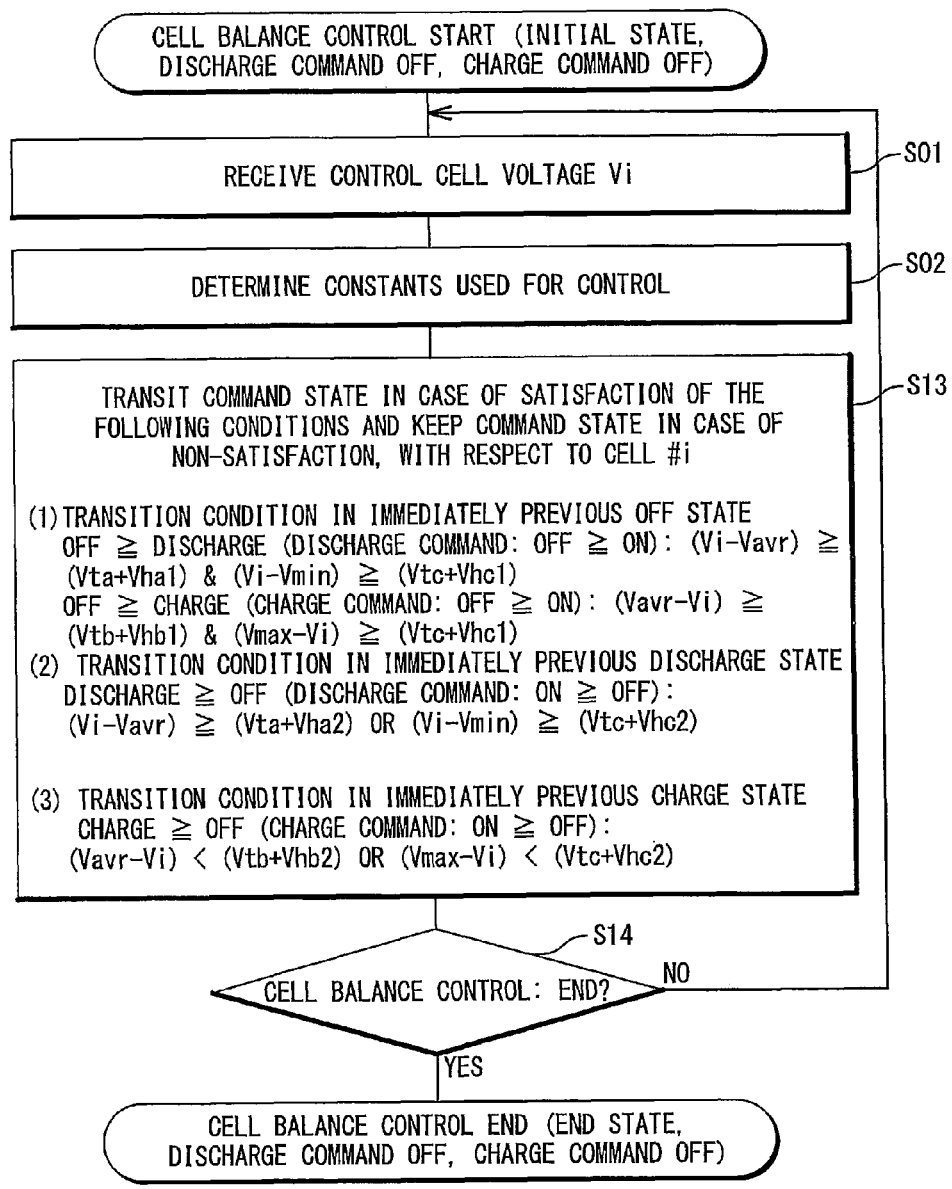
FIG. 12 shows a flowchart in an operation of the second selection method.

As described above, to stabilize the control, it is effective to apply the hysteresis characteristic to the control of charging and discharging. FIG. 12 shows a flowchart in an operation of the control section 3 to apply the hysteresis to the control of charging and discharging in a second selection method. In an initial state, any of the cells #1 to #n have neither been charged nor discharged.

In the same manner as the first selection method, the acquisition of the control cell voltages V1 to Vn of the cells 4 (step S01) and the determination of constants used for the control (step S02) are carried out. In the second selection method, at step S02, the target cell voltage Vavr, and the minimum value Vmin and maximum value Vmax of the control cell voltages V1 to Vn are determined. As described above, as the target cell voltage Vavr, an average value or a median of the control cell voltages V1 to Vn of the cells #1 to #4 can be used. In addition, the target cell voltage Vavr may be a preset value and a set value provided from the outside.

Subsequently, start and end of the charging/discharging of the cells 4 are controlled (step S13). The start and end of the charging/discharging of the cell #i is controlled in the following manner.

(1) Case that the Cell #i is not being Charged or Discharged

In this case, the discharging of the cell #i is started when the following equations are both satisfied:

$$Vi - Vavr \geq Vta + Vha1 \tag{1a},$$

$$Vi - Vmin \geq Vtc + Vhc1 \tag{1a-2}.$$

It should be noted that the charging of the cell #i is started when the following equations are both satisfied:

$$Vavr - Vi \geq Vtb + Vhb1 \tag{1b},$$

$$Vmax - Vi \geq Vtc + Vhc1 \tag{1b-2}.$$

Here, Vhc1 is a predetermined hysteresis voltage, and in one example, is determined as follows:

$$Vhc1 = Vha1 + Vhb1.$$

(2) Case where the Cell #i is Currently being Discharged

In this case, the discharging is ended when at least one of the following equations is satisfied:

$$Vi - Vavr < Vta + Vha2 \tag{2},$$

$$Vi - Vmin < Vtc + Vhc2 \tag{2-2}.$$

Here, Vha2 is a predetermined hysteresis voltage. By setting the hysteresis voltages Vha1 and Vhc2 of the equations (1a) and (1a-2) and the hysteresis voltages Vha2 and Vhc2 of the equations (2) and (2-2) so as to satisfy the following conditions:

$$Vha1 > Vha2 \geq 0,$$

$$Vhc1 > Vhc2 \geq 0,$$

the hysteresis is given to the start and end of the discharging to intend to stabilize the discharging.

(3) Case where the Cell #i is Currently being Charged.

In this case, the charging is ended when the following equations are satisfied:

$$Vavr - Vi < Vta + Vhb2 \tag{3},$$

$$Vmax - Vi < Vtc + Vhc2 \tag{3-2}.$$

By setting the hysteresis voltages Vhb1 and Vhc1 of the equations (1b) and (1b-2) and the hysteresis voltages Vhb2 and Vhc2 of the equations (3) and (3-2) so as to satisfy the following conditions:

$$Vhb1 > Vhb2 \geq 0,$$

$$Vhc1 > Vhc2 \geq 0,$$

the hysteresis is given to the start and end of the charging to intend to stabilize the charging.

The charging and discharging control of the cell 4 is carried out by repeating the above-mentioned steps S01, S02, and S13 at an optional interval. When the end of the cell balance control is instructed (step S14), the cell balance control is ended, and the charging and discharging of all the cells 4 are stopped. In order to further improve the stability of the control, changing of the charging and discharging states of the cells 4 may be prohibited for a predetermined time τ after the charging and discharging states of the cells 4 are changed.

In the above-mentioned equations (1a-2), (1b-2), (2-2), and (3-2), while an equality sign and an inequality sign are given to the equations (1a-2) and (1b-2), the equality sing is not given to the equations (2-2) and (3-2). However, existence of the equality sign can be optionally determined in the equations (1a-2), (1b-2), (2-2), and (3-2).

It should be noted that when the hysteresis is not required to be applied to the start and end of the charging and discharging, the above-mentioned hysteresis voltages Vha1 and Vha2 may be set to the same value (typically 0), the hysteresis voltages Vhb1 and Vhb2 may be set to the same value (typically 0), and the hysteresis voltages Vhc1 and Vhc2 may be set to the same value (typically 0).

When the discharge current and the charge current can be controlled, it is preferred for the charge current and the discharge current for the cell #i to be controlled based on a difference between the control cell voltage Vi and the target cell voltage Vavr. For example, in the second selection method, it is preferred for the discharge current Idi and the charge current Ici of the cell #i to be determined as function values of the following functions:

$$Idi = Fd(\min[(Vi - Vavr) - (Vta + Vha2), (Vi - V\min) - (Vtc + Vhc2)]),$$

$$Ici = Fc(\min[(Vavr - Vi) - (Vta + Vhb2), V\max - Vi) - (Vtc + Vhc2)]).$$

Here, Fd(x) and Fc(x) are functions that monotonously increase (in a broad sense) with respect to x, and min[x, y] is a function showing the smaller one of x and y. Instead of calculating the discharge current Idi and the charge current Ici by using the functions Fd and Fc, a table showing relations between the control cell voltage Vi, the target cell voltage Vavr, the maximum cell voltage Vmax, and the minimum cell voltage Vmin; and the discharge current Idi and the charge current Ici may be prepared.

(Third Selection Method)

FIGS. 13A to 13D are diagrams showing a third selection method for selecting the cell 4 to be charged/discharged. In the third selection method, the cell 4 to be charged or discharged is selected on the basis of a relation between the maximum value Vmax and minimum value Vmin of the control cell voltages V1 to Vn; and the control cell voltages of the cells 4. Compared to the first and second selection methods, the third selection method is a method that focuses more on the cell balance, and the uniformity of the voltage of the cell is improved.

More specifically, in the third selection method, when the control cell voltage Vi is Vmin+Vta or more (or exceeds Vmin+Vta) (a1) and is Vmax−Vtb or more (or exceeds Vmax−Vtb) (a2), the cell #i is discharged. On the other hand, when the control cell voltage Vi is Vmax−Vtb or less (or is lower than Vmax−Vtb) (b1) and is Vmin+Vta or less (or is lower than Vmin+Vta) (b2), the cell #i is charged.

Figure 13A:
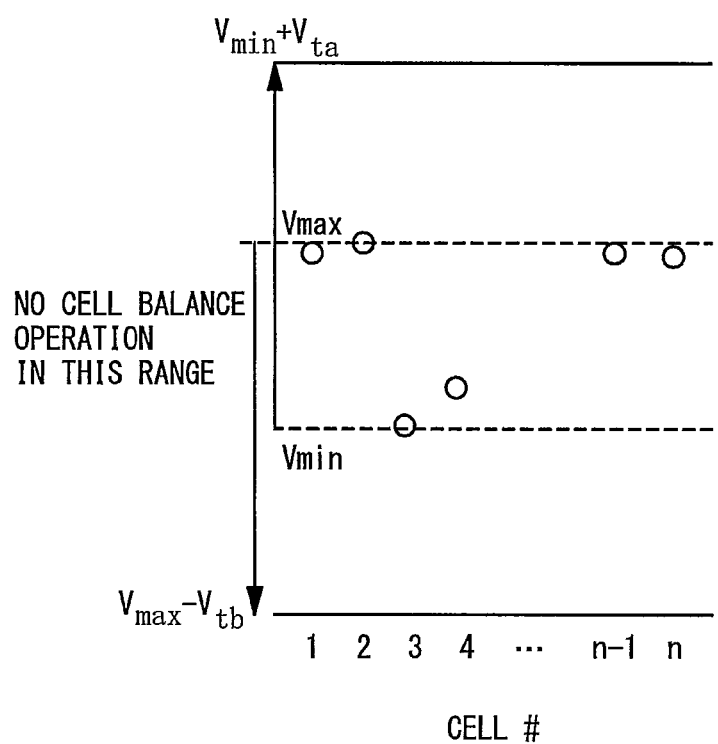
FIG. 13A is a diagram schematically showing a third selection method for selecting a cell to be charged or discharged.

FIG. 13A shows an example of the charging and discharging control when the control cell voltages of all the cells 4 are a range higher than the voltage Vmax−Vtb and lower than the voltage Vmin+Vta. In this case, any cells 4 are neither be charged nor discharged.

Figure 13B:
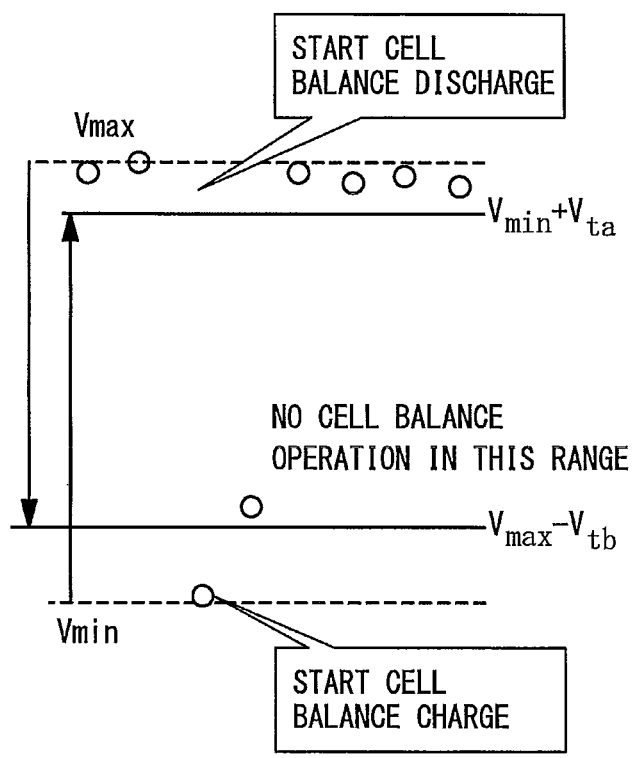
FIG. 13B is a diagram schematically showing the third selection method for selecting the cell to be charged or discharged.

FIG. 13B shows an example of the charging and discharging control when the control cell voltages of a few cells 4 (two cells 4 in FIG. 13B) are greatly low. Specifically, in the example of FIG. 13B, the control cell voltages of many cells 4 are distributed in the vicinity of the maximum value Vmax, and additionally exceed the voltage Vmin+Vta. In addition, the control cell voltage of one of the two cells 4 having the low control cell voltage falls below the voltage Vmax−Vtb, and the control cell voltage of the other one exceeds the voltage Vmax−Vtb. In this case, many cells 4 whose control cell voltages exceed the voltage Vmin+Vta are discharged, and one of the cells 4 whose control cell voltage falls below the voltage Vmax−Vtb is charged.

Figure 13C:
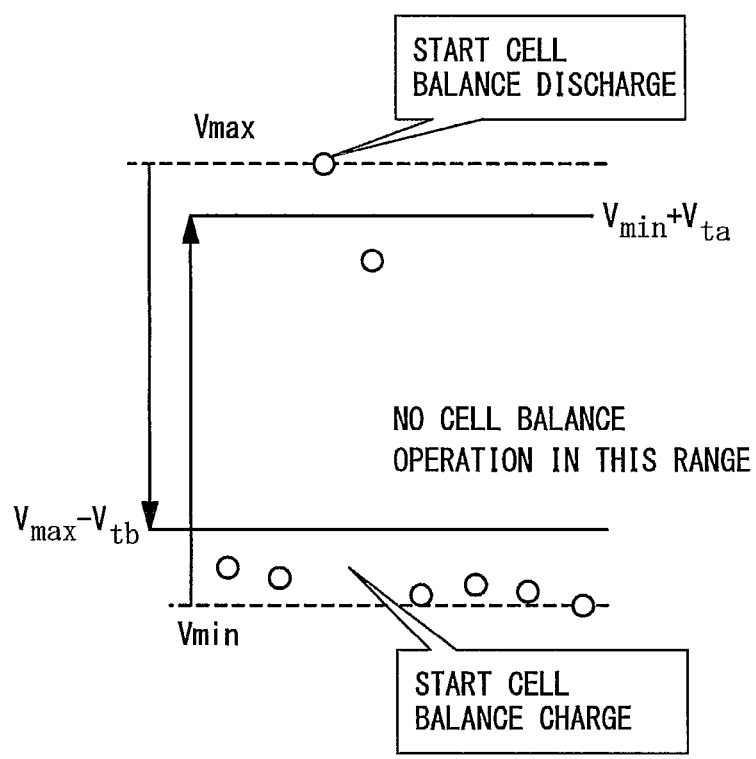
FIG. 13C is a diagram schematically showing the third selection method for selecting the cell to be charged or discharged.

FIG. 13C shows an example of the charging and discharging control when the control cell voltages of a few cells 4 (two cells 4 in FIG. 13C) are greatly high. Specifically, in the example of FIG. 13C, the control cell voltages of many cells 4 are distributed in the vicinity of the minimum value Vmin, and fall below the voltage Vmax−Vtb. In addition, the control cell voltage of one of the two cells 4 having the high control cell voltage exceeds the voltage Vmin+Vta, and the control cell voltage of the other one falls below the voltage Vmin+Vta. In this case, many cells 4 whose control cell voltages fall below the voltage Vmax−Vtb are charged, and one of the cells 4 whose control cell voltage exceeds the voltage Vmin+Vts is discharged.

Figure 13D:
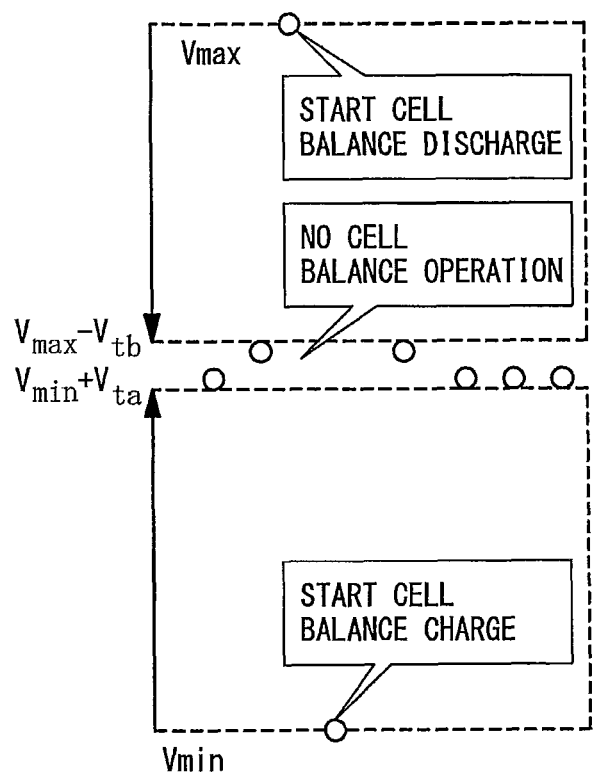
FIG. 13D is a diagram schematically showing the third selection method for selecting the cell to be charged or discharged.

FIG. 13D shows an example of the charging and discharging control when the control cell voltages of one of the cells 4 is greatly high, where the control cell voltages of another one of the cells 4 is greatly low, and when the control cell voltages of other many cells 4 are in intermediate levels of the voltages. The control cell voltages of the many cells 4 are between the voltage Vmin+Vta and the voltage Vmax−Vtb. In this case, the cell 4 whose control cell voltage is greatly high is discharged, and the cell 4 whose control cell voltage is greatly low is charged. The cells 4 whose control cell voltage is intermediate are neither charged nor discharged.

Figure 14A:
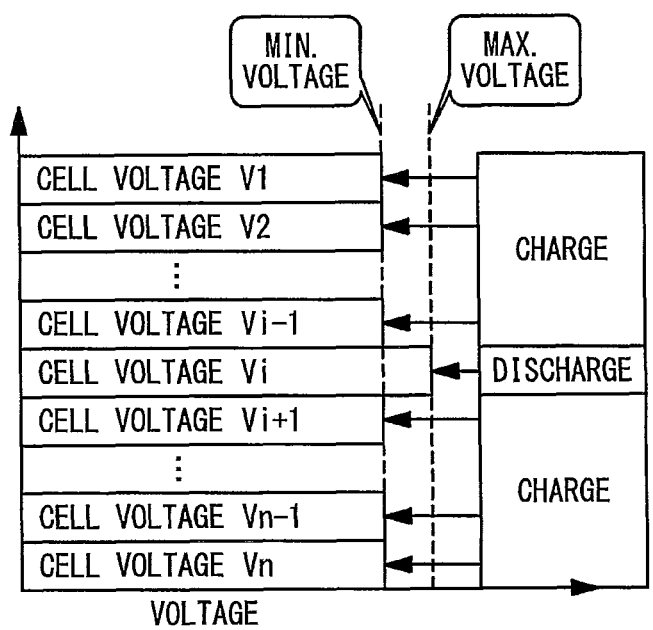
FIG. 14A is a schematic diagram showing the cell balance control according to the third selection method.
Figure 14B:
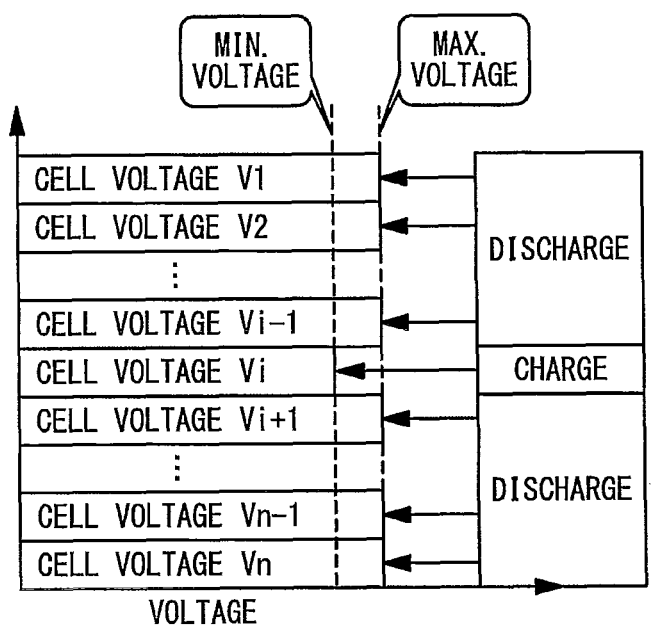
FIG. 14B is a schematic diagram showing the cell balance control according to the third selection method.
Figure 14C:
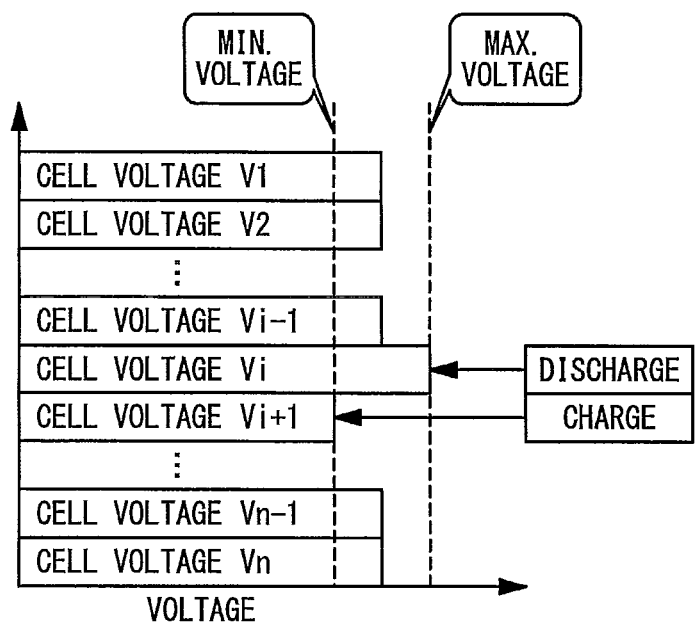
FIG. 14C is a schematic diagram showing the cell balance control according to the third selection method.

As understood from the above-mentioned explanation, in the third selection method, when the control cell voltages of a small number of the cells 4 are greatly high, a small number of the cells 4 are discharged and other many cells 4 are charged, thereby maintaining the cell balance, as shown in FIG. 14A. In the same manner, when the control cell voltages of a small number of the cells 4 are greatly low, a small number of the cells 4 are charged and other many cells 4 are discharged, thereby maintaining the cell balance, as shown in FIG. 14B. In this control, many cells 4 are charged or discharged. However, the uniformity of voltages between the cells 4 is improved. Additionally, when the control cell voltages of a small number of the cells 4 are greatly high and the control cell voltages of a small number of the cells 4 are greatly low, the small number of the cells 4 having the high control cell voltage are discharged and the small number of the cells 4 having the low control cell voltage are charged, as shown in FIG. 14C. In this case, the cell balance is controlled by the charging or discharging of a small number of the cells 4, and the uniformity of voltages between the cells 4 is improved.

As described above, to stabilize the control, it is effective to apply the hysteresis to the control of charging and discharging. FIG. 15 shows a flowchart in an operation of the control section 3 to apply the hysteresis to the control of charging and discharging in the third selection method. In an initial state, any of the cells #1 to #n have neither been charged nor discharged.

In the same manner as the first and second selection methods, the acquisition of the control cell voltages V1 to Vn of the cells 4 (step S01) and the determination of constants used for the control (step S02) are carried out. In the third method, at step S02, the minimum value Vmin and maximum value Vmax of the control cell voltages V1 to Vn are determined.

Subsequently, start and end of the charging/discharging of the cells 4 are controlled (step S23). The start and end of the charging/discharging of the cell #i is controlled in the following manner.

(1) Case where the Cell #i is Neither Currently Being Charged Nor Discharged.

In this case, the discharging of the cell #i is started when the following equations are both satisfied:

$$Vi-V\min \geq Vta+Vha1, \quad (11a\text{-}1)$$

$$V\max-Vi < Vtb+Vhb1 \quad (11a\text{-}2).$$

It should be noted that the charging of the cell #i is started when the following equations are both satisfied:

$$Vi-V\min < Vta+Vha1, \quad (11b\text{-}1)$$

$$V\max-Vi \geq Vtb+Vhb1 \quad (11b\text{-}2).$$

Here, Vha1 and Vhb1 are predetermined hysteresis voltages.

(2) Case where the Cell #i is Currently being discharged.

In this case, the discharging is ended when at least one of the following equations is satisfied:

$$Vi-V\min < Vta+Vha2, \quad (12\text{-}1)$$

$$V\max-Vi \geq Vtb+Vhb1 \quad (12\text{-}2).$$

Here, Vha2 is a predetermined hysteresis voltage. By setting the hysteresis voltages Vha1 and Vha2 so as to satisfy the following condition:

$$Vha1 > Vha2 \geq 0,$$

the hysteresis is applied to the start and end of the discharging to intend to stabilize the discharging.

(3) Case where the Cell #i is Currently being Charged.

In this case, the charging is ended when at least one of the following equations is satisfied:

$$Vi-V\min \geq Vta+Vha1, \quad (13\text{-}1)$$

$$V\max-Vi < Vtb+Vhb2 \quad (13\text{-}2).$$

Here, Vhb2 is a predetermined hysteresis voltage. By setting the hysteresis voltages Vhb1 and Vhb2 so as to satisfy the following condition:

$$Vhb1 > Vhb2 \geq 0,$$

the hysteresis is applied to the start and end of the charging to intend to stabilize the charging.

The charging and discharging control of the cell 4 is carried out by repeating the above-mentioned steps S01, S02, and S23 at an optionally interval. When the end of the cell balance control is instructed (step S04), the cell balance control is ended, to stop the charging and discharging of all the cells 4. In order to further improve the stability of the control, changing of the charging and discharging states of the cells 4 may be prohibited for a predetermined time after the charging and discharging states of the cells 4 are changed.

When the discharge current and the charge current can be controlled, it is preferred for the charge current or the discharge current of the cell #i to be controlled based on a difference between the control cell voltage Vi and the target cell voltage Vavr. For example, in the second selection method, it is preferred for the discharge current Idi and the charge current Ici for the cell #i to be determined as function values of the following functions:

$$Idi = Fd(\min[(Vi-V\min)-(Vta+Vha2),(V\max-Vi)-(Vtb+Vhb1)]),$$

$$Ici = Fc(\min[(Vi-V\min)-(Vta+Vhb1),(V\max-Vi)-(Vtb+Vhc2)]).$$

Here, both of Fd(x) and Fc(x) are functions that monotonously increase (in a broad sense) with respect to x, and min[x, y] is a function showing the smaller one of x and y. Instead of calculating the discharge current Idi and the charge current Ici by using the functions Fd and Fc, a table showing relations between the control cell voltage V1, the maximum cell voltage Vmax, and the minimum cell voltage Vmin; and the discharge current Idi and the charge current Ici may be prepared.

(Fourth Selection Method)

FIG. 16A to FIG. 16D are diagrams showing a fourth selection method for selecting the cell 4 to be charged/discharged. In the fourth selection method, a voltage range having a particular width is searched so that the number of cells 4 having the control cell voltage within the voltage range is the maximum. The cell 4 whose control cell voltage is lower than a lower limit value of the voltage range is charged, and the cell 4 whose control cell voltage is higher than an upper limit value of the voltage range is discharged.

More specifically, a value of a voltage Vpara when the number of cells 4 having the control cell voltage within a voltage range between the voltage Vpara and a voltage Vpara+Vtc (hereinafter referred to as a "voltage range Vtc") is the maximum is searched and determined. Here, Vtc is a predetermined constant indicating an extent of a width of the voltage range Vtc. The cell 4 whose control cell voltage is the voltage Vpara or less (or is less than the voltage Vpara) is charged, and the cell 4 whose control cell voltage is the voltage Vpara+Vtc or more (or exceeds the voltage Vpara+Vtc) is discharged. When the cell 4 whose control cell voltage is the voltage Vpara or more (or exceeds the voltage Vpara) or the voltage Vpara+Vtc or less (or is less than the voltage Vpara+Vtc), the cell 4 is neither charged nor discharged.

Figure 16A:
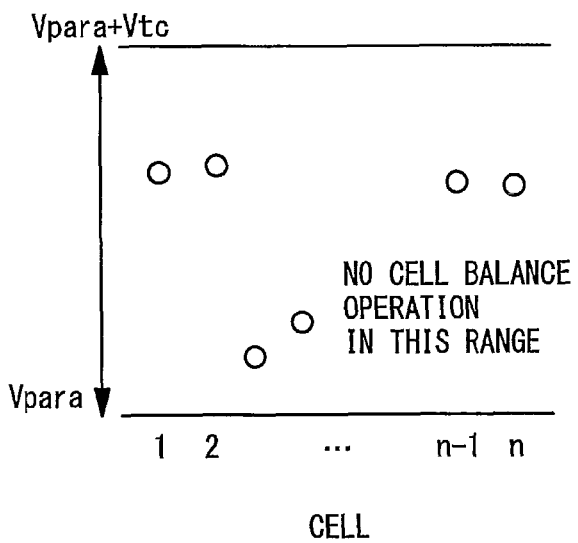
FIG. 16A is a diagram schematically showing a fourth selection method for selecting a cell to be charged or discharged.
Figure 16B:
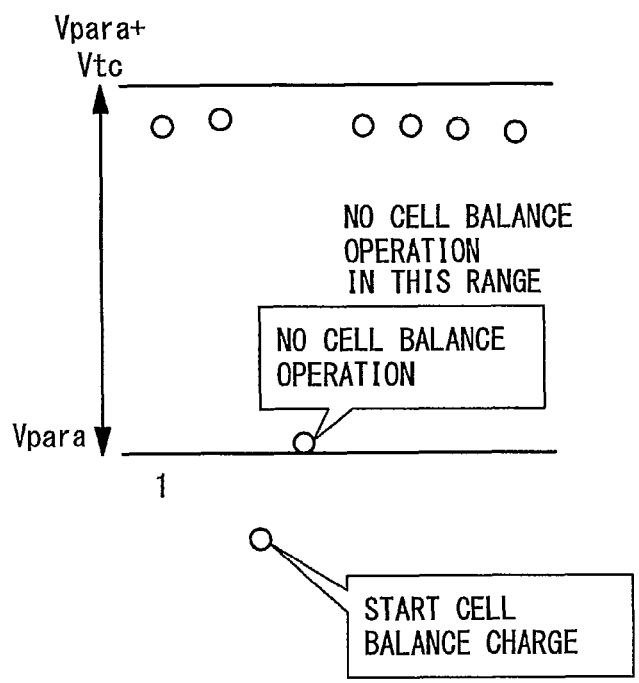
FIG. 16B is a diagram schematically showing the fourth selection method for selecting the cell to be charged or discharged.
Figure 16C:
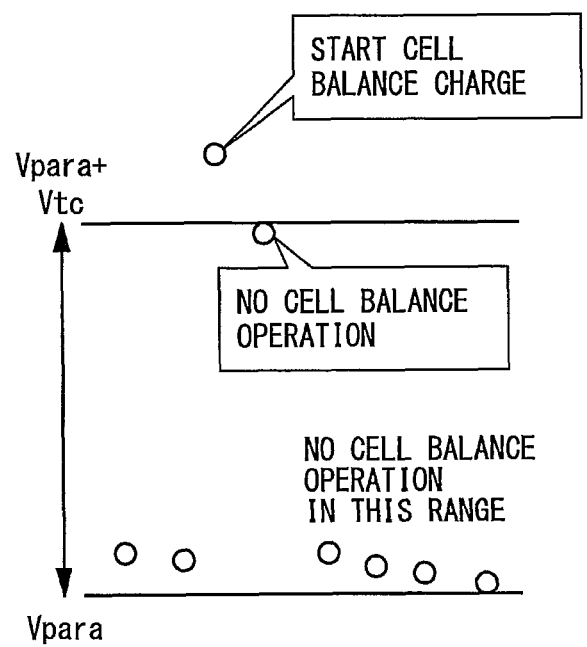
FIG. 16C is a diagram schematically showing the fourth selection method for selecting the cell to be charged or discharged.
Figure 16D:
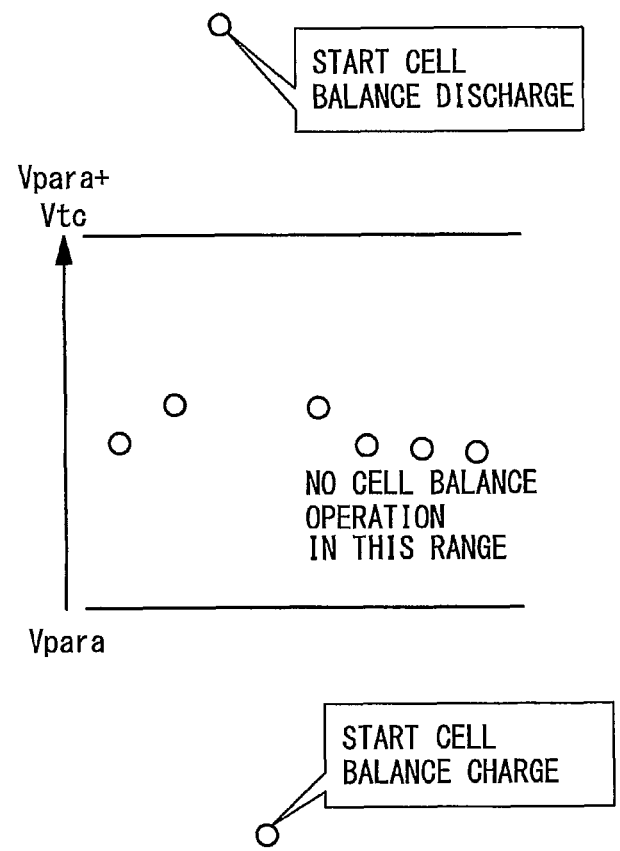
FIG. 16D is a diagram schematically showing the fourth selection method for selecting the cell to be charged or discharged.

FIGS. 16A to 16D show examples of the control of charging and discharging in the fourth selection method. FIG. 16A shows the charging and discharging control when the control cell voltages of all the cells 4 is in a range between the voltage Vpara and the voltage Vpara+Vtc. In this case, any of the cells 4 is neither charged nor discharged. FIG. 16B shows the charging and discharging control when the control cell voltage of a particular cell 4 falls below the voltage Vpara. In this case, the particular cell 4 is charged. FIG. 16C shows the charging and discharging control when the control cell voltage of a particular cell 4 exceeds the voltage Vpara+Vtc. In this case, the particular cell 4 is discharged. FIG. 16D shows the charging and discharging control when the control cell voltage of a particular cell 4 exceeds the voltage Vpara+Vtc and the control cell voltage of a particular cell 4 falls below the voltage Vpara. In this case, the particular cell 4 whose control cell voltage exceeds the voltage Vpara+Vtc is discharged and the particular cell 4 whose control cell voltage falls below the voltage Vpara is charged.

In the configuration of the first embodiment (FIGS. 3A and 3B), the above-described selection methods are used for generation of a charge command and a discharge command in the control section 3. When the cell 4 to be charged/discharged is selected in any one of the above-described first to fourth selection methods, the charge command and discharge command corresponding to the selection are generated by the control section 3 and is supplied to the cell module 1.

It should be noted that in the second to fifth embodiments, the above-described selection methods are used for generation of the charge recommend command and the discharge recommend command in the cell balance control section 8 of the control section 3. When the cell 4 to be charged/discharged is selected in any one of the above-described first to fourth selection methods, the cell balance control section 8 generates the charge recommend command and the discharge recommend command corresponding to the selection and supplies the commands to the cell selecting section 9. The cell selecting section 9 determines the cells 4 to be actually charged or discharged from among the cells 4 instructed by the charge recommend command or the discharge recommend command.

3. Logic of Cell Selecting Section

In the configurations of the above-described second to fifth embodiments, since the number of the charging sections 5 and/or the discharging section 6 is smaller than the number of the cells 4, the cells 4 of the numbers instructed by the charge recommend command and discharge recommend command generated by the above-described selection methods sometimes cannot be simultaneously charged or discharged. In this case, it is required to select the cell 4 to be actually charge or discharge on the basis of any logic. In the following description, the logic for selecting the cells 4 to be actually charged or discharged from among the cells 4 recommended to be charged or discharged by the charge recommend command or the discharge recommend command will be described.

One method is a method of determining priorities of the cells 4 recommended to be charged or discharged by the charge recommend command or the discharge recommend command on the basis of any parameter and of selecting the cells 4 to be actually charged or discharged on the basis of the priorities. In the following description, the logic for selecting the cells 4 to be actually charged pr discharged on the basis of the priorities will be described.

(1) Case where the Number of Discharging Sections 6 is Short (the Third and Fourth Embodiments)

In the third and fourth embodiments (FIGS. 5A, 5B, 6A, and 6B), the number of the discharging sections 6 is smaller than the number of cells 4. When the number of cells 4 recommended to be discharged by the charge recommend command is α and the number of discharging sections 6 is β (α>β), the priorities is determined to the α cells 4 recommended to be discharged, and the β cells 4 in the higher priorities of the α cells 4 are selected as the cells 4 to be actually discharged.

Figure 17A:
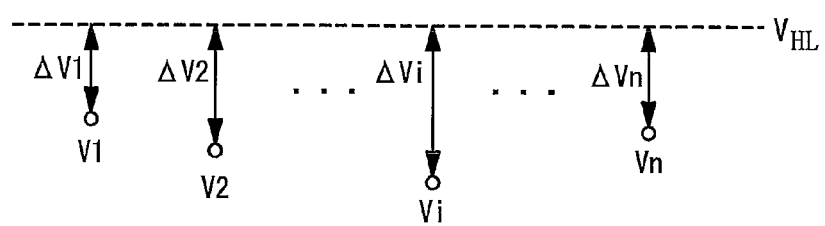
FIG. 17A is a diagram showing a selection method of an actually-discharged cell when the number of discharging sections is short.

In one example, as shown in FIG. 17A, the priorities are determined on the basis of a difference ΔVi (=$V_{HL}$−Vi) between a cell voltage permissible upper limit value $V_{HL}$ and the control cell voltage Vi of each cell 4 recommended to be discharged. Here, the cell voltage permissible upper limit value $V_{HL}$ is a value preset to the cell selecting section 9 and is an upper limit value of a permissible cell voltage. When the difference ΔVi is smaller, the higher priority is assigned to the discharging of the cell #i. Since the difference ΔVi is normally a positive value, when the control cell voltage Vi is higher, the higher priority is assigned in the above-mentioned determination method. In order to prevent the overcharge of the cells 4, it is effective that when the control cell voltage Vi is closer to the cell voltage permissible upper limit value $V_{HL}$, the higher priority is assigned. The β cells 4 in the higher priorities are selected as the cells 4 to be actually discharged.

In other example, the priority is determined on the basis of a time (a recommended time) started with the discharge recommendation by the discharge recommend command. When the recommended time is older, the higher priority may be assigned, and when the recommended time is newer, the higher priority may be assigned.

In further another example, the priority is determined on the basis of magnitude of the discharge current instructed by the discharge current recommend command. When the discharge current is larger, the higher priority is assigned. When the discharging section 6 carries out the discharging by using a variable resistance, the priority may be determined on the basis of magnitude of the variable resistance instead.

In further another example, the priorities are determined on the basis of degrees of degradation of the cells 4 (when a history of usage is longer, the cell 4 is degraded more generally). The priority based on the degree of degradation of the cell 4 is preset to the cell selecting section 9. The p cells 4 in the higher priorities are selected as the cells 4 to be actually discharged.

In further another example, the priorities are determined on the basis of capacities of the cells 4. The priorities based on the capacities of the cells 4 are preset to the cell selecting section 9. The β cells 4 in the higher priorities are selected as the cells 4 to be actually discharged.

(2) Case where the Number of Charging Sections 5 is Short (the Third and Fifth Embodiments)

In the third and fifth embodiments (FIGS. 5A, 5B, 7A, and 7B), the number of charging sections 5 is smaller than the number of cells 4. When the number of cells 4 recommended to be charged by the charge recommend command is α and the number of the charging sections 5 is β (α>β), the priorities are determined to the α cells 4 recommended to be charged, and the β cells 4 in the higher priorities of the α cells 4 are selected as the cells 4 to be actually charged.

Figure 17B:
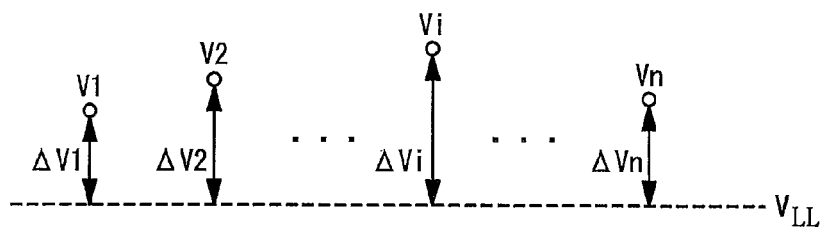
FIG. 17B is a diagram showing the selection method of the actually-discharged cell when the number of charging sections is short.

In one example, as shown in FIG. 17B, the priority is determined on the basis of a difference ΔVi (=Vi−$V_{LL}$) between a cell voltage permissible lower limit value $V_{LL}$ and the control cell voltage Vi of each of the cells 4 recommended to be charged. Here, the cell voltage permissible lower limit value $V_{LL}$ is a value preset to the cell selecting section 9 and is a lower limit value of a permissible cell voltage. When the difference ΔVi is smaller, the higher priority is assigned to the cell 4 recommended to be charged. Since the difference ΔVi (=Vi−$V_{LL}$) is normally a positive value, when the control cell voltage Vi is higher, the higher priority is assigned in the above-mentioned determination method. In order to prevent the over discharge of the cells 4, it is effective that when the control cell voltage Vi is closer to the cell voltage permissible lower limit value, the higher priority is assigned. The β cells 4 in the higher priorities are selected as the cells 4 to be actually charged.

In another example, the priority is determined on the basis of a time (a recommended time) started with charge recommendation by the charge recommend command. When the recommended time is older, the higher priority may be assigned, and when the recommended time is newer, the higher priority may be assigned.

In further another example, the priority is determined on the basis of magnitude of the charge current instructed by the charge current recommend command. When the charge current is larger, the higher priority is assigned. The priority may be determined on the basis of magnitude of the charge voltage instead of the charge current.

In further another example, the priority is determined on the basis of degree of degradation of the cell 4 (when a history of usage is longer, the cell 4 is degraded more generally). The priority based on the degree of degradation of the cell 4 is preset to the cell selecting section 9. The β cells 4 in the higher priorities are selected as the cells 4 to be actually charged.

In further another example, the priorities are determined on the basis of capacities of the cells 4. The priorities based on the capacities of the respective cells 4 are preset to the cell selecting section 9. The β cells 4 in the higher priorities are selected as the cells 4 to be actually charged.

(3) Case where the Number of Pairs of Charging Sections 5 and Discharging Sections 6 is Lack (the Second Embodiment)

In the second embodiment (FIGS. 4A and 4B), the number of pairs of charging sections 5 and discharging sections 6 is smaller than the number of cells 4, and the charging and the discharging cannot be independently carried out. When a total of the number of cells 4 recommended to be charged by the charge recommend command and the number of cells 4 recommended to be discharged by the discharge recommend command is α and when the number of charging sections 5 and discharging sections 6 is β (α>β), the priorities are determined to the α cells 4 recommended to be charged or discharged, and the β cells 4 in the higher priorities of the α cells 4 are selected as the cells 4 to be actually charged or discharged.

Figure 17C:
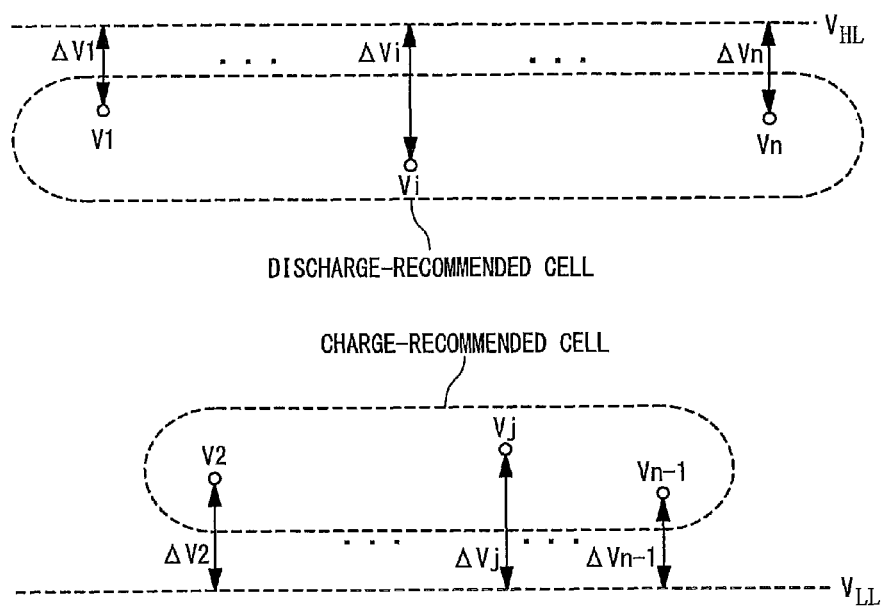
FIG. 17C is a diagram showing the selection method of the actually-discharged cell when the number of pairs of the discharging section and charging section is short.

In one example, as shown in FIG. 17C, a difference $\Delta Vi$ ($=V_{HL}-Vi$) between the cell voltage permissible upper limit value $V_{HL}$ and the control cell voltage Vi of the cell 4 is calculated for the cell 4 recommended to be discharged, a difference $\Delta Vi$ ($=Vi-V_{LL}$) between the cell voltage permissible lower limit value $V_{LL}$ and the control cell voltage V1 of the cell 4 is calculated for the cell 4 recommended to be charged, and the priorities are determined on the basis of magnitudes (an absolute value) of the calculated differences $\Delta Vi$.

As one method, when the difference $\Delta Vi$ calculated for the cell 4 is smaller, the higher priority is assigned. As described above, it should be noted that the difference $\Delta Vi$ is defined as the difference $V_{HL}-Vi$ with respect to the cell 4 recommended to be discharged and is defined as the difference $Vi-V_{LL}$ with respect to the cell 4 recommended to be charged.

As another method, an operation to prioritize the discharging over the charging can be carried out (a discharge prioritizing operation). Specifically, a higher priority is preferentially assigned to the cell 4 recommended to be discharged, and a priority lower than the lowest of the priorities of the cells 4 recommended to be discharged is assigned to the cell 4 recommended to be charged. In the cells 4 recommended to be discharged, when the difference $\Delta Vi$ between the cell voltage permissible upper limit value $V_{HL}$ and the control cell voltage Vi of the cell 4 is smaller, the higher priority is assigned. In the same manner, in the cells 4 recommended to be charged, when the difference $\Delta Vi$ between the cell voltage permissible lower limit value $V_{LL}$ and the control cell voltage Vi of the cell 4 is smaller, the higher priority is assigned.

As further another method, an operation to prioritize the charging over the discharging can be carried out (a charge prioritizing operation). Specifically, a higher priority is preferentially assigned to the cell 4 recommended to be charged. A priority lower than the lowest of the priorities of the cells 4 recommended to be charged is assigned to the cell 4 recommended to be discharged. In the cells 4 recommended to be charged, when the difference $\Delta Vi$ between the cell voltage permissible lower limit value $V_{LL}$ and the control cell voltage Vi of the cell 4 is smaller, the higher priority is assigned. In the same manner, in the cells 4 recommended to be discharged, when the difference $\Delta Vi$ between the cell voltage permissible upper limit value $V_{HL}$ and the control cell voltage Vi of the cell 4 is smaller, the higher priority is assigned.

As further another method, an operation to alternately perform the charging and the discharging can be carried out (a charging and discharging alternate operation). A high priority is assigned alternately to the cell 4 recommended to be charged and to the cell 4 recommended to be discharged. For example, an odd-numbered priority is assigned to the cell 4 recommended to be discharged, and an even-numbered priority is assigned to the cell 4 recommended to be charged. Instead, the even-numbered priority may be assigned to the cell 4 recommended to be discharged, and the odd-numbered priority may be assigned to the cell 4 recommended to be charged. In the cells 4 recommended to be discharged, when the difference $\Delta Vi$ between the cell voltage permissible upper limit value $V_{HL}$ and the control cell voltage Vi of the cell 4 is smaller, the higher priority is assigned. In the same manner, in the cells 4 recommended to be charged, when the difference $\Delta Vi$ between the cell voltage permissible lower limit value $V_{LL}$ and the control cell voltage Vi of the cell 4 is smaller, the higher priority is assigned.

Further another method, it may be determined which of the charging or the discharging is prioritized, on the basis of the number of cells 4 recommended to be charged and the number of cells 4 recommended to be discharged (a few cells prioritizing operation). When the number of cells 4 recommended to be charged is smaller than the number of cells 4 recommended to be discharged, the above-mentioned charge prioritizing operation is carried out. On the other hand, when the number of cells 4 recommended to be discharged is smaller than the number of cells 4 recommended to be charged, the above-mentioned discharge prioritizing operation is carried out.

In another example, the priority is determined on the basis of a time (a recommended time) started with charge recommendation by the charge recommend command or the discharge recommend command. When the recommended time is older, the higher priority may be assigned, and when the recommended time is newer, the higher priority may be assigned. In addition, when the priority is determined on the basis of the recommended time, the discharge prioritizing operation, the charge prioritizing operation, the alternate operation, and the few cells prioritizing operation can be applied in the same manner of the control based on the difference $\Delta Vi$.

In further another example, the priority is determined on the basis of magnitude of the charge current instructed by the charge current recommend command or the discharge current instructed by the discharge current recommend command. As one method, when the charge current or the discharge current is larger, the higher priority is assigned. Also, when the priority is determined on the basis of the charge current or the discharge current, the discharge prioritizing operation, the charge prioritizing operation, the alternate operation, and the few cells prioritizing operation can be applied in the same manner of the control based on the difference $\Delta Vi$.

In further another example, the priorities are determined on the basis of degrees of deterioration of the cells 4. The priorities based on the degrees of degradation of the cells 4 are preset to the cell selecting section 9. As one method, the β cells 4 in the higher priorities are selected as the cells 4 to be actually charged. In addition, when the priorities are determined on the basis of the degrees of degradation, the discharge prioritizing operation, the charge prioritizing operation, the alternate operation, and the few cells prioritizing operation can be applied in the same manner of the control based on the difference ΔVi.

In further another example, the priority is determined on the basis of capacity of the cell 4. The priorities based on the capacities of the cells 4 are preset to the cell selecting section 9. As one method, the β cells 4 in the higher priorities are selected as the cells 4 to be actually charged. In addition, when the priorities are determined on the basis of the capacities of the cells 4, the discharge prioritizing operation, the charge prioritizing operation, the alternate operation, and the few cells prioritizing operation can be applied in the same manner of the control based on the difference ΔVi.

Further another method for selecting the cell 4 to be actually charged or discharged is to carry out the charging or discharging by the charging section 5 or the discharging section 6 to the cell 4 recommended to be, charged or discharged in a time-division manner. In this case, the priority is not determined. For example, when the number of discharging sections 6 is short in the third and fourth embodiments, the cells 4 recommended to be discharged are subsequently connected to the discharging section 6 by the switches SWd1 to SWdn to be sequentially discharged in the time-division manner by the discharging section 6. Additionally, when the number of charging sections 5 is short in the third and fifth embodiments, the cells 4 recommended to be charged are subsequently connected to the charging section 5 by the switches SWc1 to SWcn to be sequentially charged in the time-division manner by the charging section 5. Moreover, when the number of charging sections 5 and discharging sections 6 is short in the second embodiment, the cells 4 recommended to be charged and the cells 4 recommended to be discharged are connected to the charging section and the discharging section 6 in parallel by the switches SW1 to SWn to be sequentially charged and discharged in the time-division manner by the charging section 5 and the discharging section 6.

4. Calculation of Control Cell Voltage

As described above, the cell voltage calculating section 2 has a function to carry out an operation process of calculating the control cell voltages V1 to Vn from the measured cell voltages V1m to Vnm. One object of the operation process carried out in the cell voltage calculating section 2 is to remove the influence of a measurement noise. When much noises are included in the measured cell voltages V1m to Vnm, an inadequate control is sometimes carried out if the charging and discharging of the cells 4 are controlled depending on the measured cell voltages V1m to Vnm. A filtering process enables the influence of measurement noise to be suppressed.

Another object of the operation process carried out in the cell voltage calculating section 2 is to remove influence of a cell voltage variation caused by the internal resistances of the cells 4 and the charging and discharge currents. It is generally preferred for the charging and discharging of the cells 4 to be controlled depending on the cell voltage (that is, the open voltage) when the charging and discharge currents do not flow. However, when the charging and discharge currents flow, voltages different from the open voltage are outputted from the cells 4 because of the influence of internal resistances of the cells 4. For example, when the charging is carried out to the certain cell 4, an output voltage $V_{out}$ is described by the following equation:

$$V_{out} = Vo + ImRo.$$

Here, Vo is the open voltage of the cell 4, Im is the charge current flowing into the cell 4, and Ro is the internal resistances of the cell 4. When the equation is transformed, the following equation can be obtained:

$$Vo = V_{out} - ImRo.$$

When the open voltage is determined by the operation process based on the equation and the open voltage is used as the control cell voltages V1 to Vn, more preferable charging and discharging control can be realized.

Figure 18:
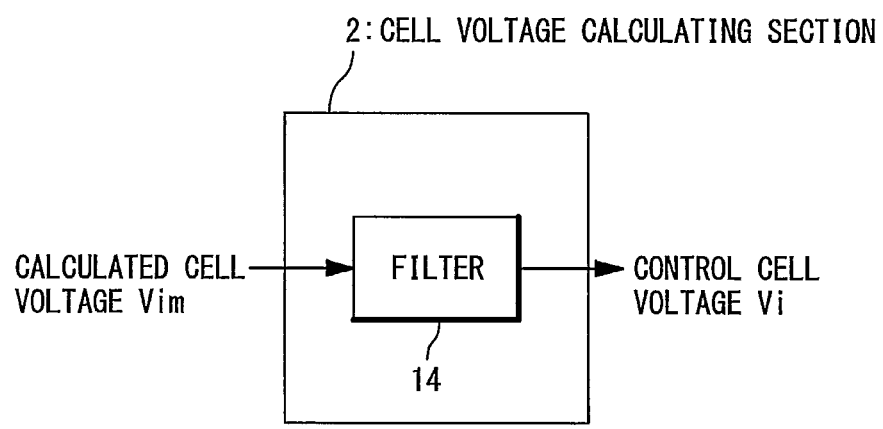
FIG. 18 is a diagram showing a configuration of a cell voltage calculating section.

The operation process of the cell voltage calculating section 2 is carried out so as to satisfy at least one of the above-mentioned two purposes. FIG. 18 shows one example of the configuration of the cell voltage calculating section 2. In the configuration of FIG. 18, the cell voltage calculating section 2 has a filter 14 for carrying out a filtering process to the measured cell voltages V1m to Vnm. As the filtering process carried out by the filter 14, for example, filtering using a first-order lag, calculation of a moving average, and filtering using a low-pass filter are exemplified. Such filtering suppresses the influence of the measurement noise to realize more preferable charging and discharging control.

Figure 19:
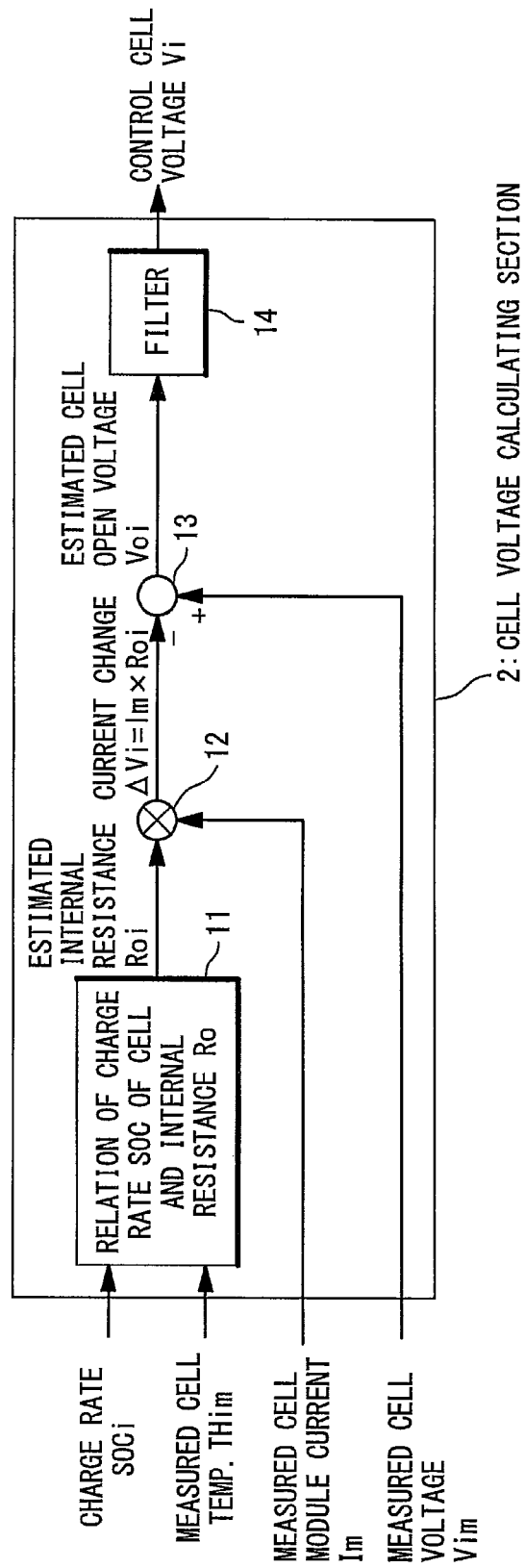
FIG. 19 is a diagram showing a configuration of the cell voltage calculating section.

FIG. 19 shows another configuration of the cell voltage calculating section 2. In a configuration of FIG. 19, the open voltages of the cells 4 are estimated, and the estimated open voltages are outputted as the control cell voltages Vi. Specifically, the cell voltage calculating section 2 includes a look-up table 11, a multiplier 12, a subtractor 13, and the filter 14. In the look-up table 11, data indicating a relation between a charging rate and the internal resistance Ro of the cell 4 is described by using a temperature of the cell 4 as a parameter. Charging rates SOCi of the cells 4, measured values of cell temperature (measured cell temperatures) THim, measured values of current flowing in the cell module 1 (measured cell module current) Im, and measured cell voltages V1m are given to the cell voltage calculating section 2. When the charging rates SOCi, the measured cell temperatures THim, the measured cell module current Im, and the measured cell voltages V1m are given, an estimated internal resistance Roi of the cell #i is calculated from the charging rates SOCi and the measured cell temperatures THim of the cell #i. The look-up table 11 is used for the calculation of the estimated internal resistance Roi. Moreover, the estimated internal resistance Roi and the measured cell module current Im are multiplied by the multiplier 12, and thus a current variation ΔVi (=Im×Roi) is calculated. Furthermore, the current variation ΔVi is subtracted from the measured cell voltage V1m by the subtractor 13, and thus the estimated cell open voltage Voi of the cell 4 is calculated. The filtering process is carried out to the estimated cell open voltage Voi by the filter 14, and thereby calculating the control cell voltage Vi of the cell #i.

When the control cell voltage Vi calculated in the above-mentioned manner is used for the charging and discharging control, the charging and discharging control can be carried out, while suppressing the influence of the measurement noise and the influence of a voltage variation caused by the internal resistance and the charging and discharge current.

Figure 20:
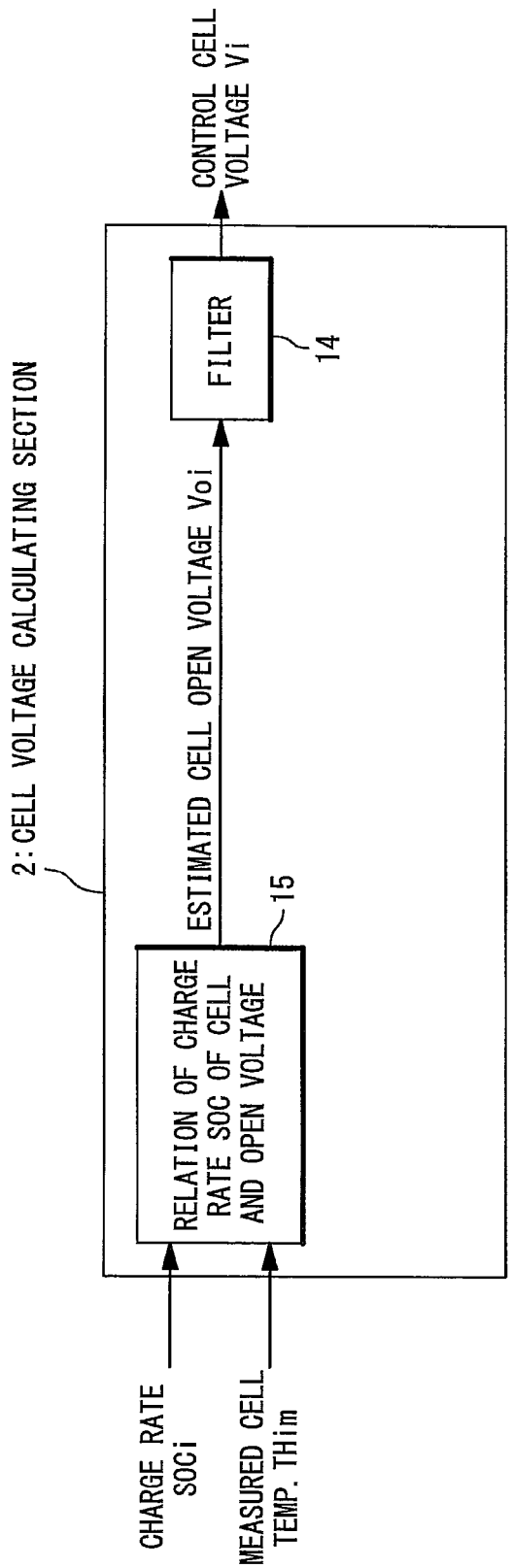
FIG. 20 is a diagram showing a configuration of the cell voltage calculating section.

FIG. 20 shows further another example of the configuration of the cell voltage calculating section 2. In FIG. 20, the open voltages of the cells 4 are estimated in the same manner as that of FIG. 19. Specifically, the cell voltage calculating section 2 includes a look-up table 15 that describes a relation between the charging rate and the internal resistance Ro of the cell 4 by using the temperature of the cell 4 as a parameter; and the filter 4. The charging rates SOCi and the measured cell temperature THim of the respective cells 4 are given to the cell voltage calculating section 2. When the charging rates SOCi and the measured cell temperatures THim are given, an estimated cell open voltage Voi is calculated from the charging rate SOCi and the measured cell temperature THim of the cell #i. Moreover, the filtering process is carried out to the estimated cell open voltage Voi by the filter 14, and thereby calculating the control cell voltage Vi of the cell #i.

When the control cell voltage Vi calculated in the above-mentioned manner is used for the charging and discharging control, the charging and discharging control can be carried out, while suppressing the influence of the measurement noise and the influence of the voltage variation caused by the internal resistance and the charging and discharge current.

FIG. 21 shows further another example of the configuration of the cell voltage calculating section 2. In FIG. 21, future open voltages of the cells 4 are predicted, and the control cell voltage Vi is calculated from the predicted open voltage Voi(t). Specifically, the cell voltage calculating section 2 includes a charging rate predicting section 16, a look-up table 17, and a calculation result processing section 18.

The charging rate predicting section 16 calculates a future predicted charging rate SOCi(t) that is an predicted value of a future charging rate from the charging rates (measured charging rates) SOCim of the cells 4 obtained by measurement of the cell monitoring section 7, a future cell current planned vale I(t) (t=0 to L), and cell capacities Ahi of the cells 4. Here, the cell current planned vale I(t) is a current value planned (or estimated) to be inputted into and outputted from the cell module 1 in future, and is given from the outside of the secondary cell control system 10. In addition, a time t=0 represents a present time, and a time t=L represents a particular future time. Specifically, the charging rate predicting section 16 calculates the future predicted charging rate SOCi(t) on the basis of the following equation:

$$SOCi(t)=SOCim+\int I(t)dt/Ahi\times 100.$$

In the look-up table 17, a relation between the charging rate and an open voltage of the cell 4 is described by using the measured cell temperature THim as a parameter. The look-up table 17 is used for calculating the future predicted cell voltage Voi(t) that is a predicted value of the future open voltage of the cell #i on the basis of the future predicted charging rate SOCi(t) calculated by the charging rate predicting section 16 and the measure cell temperature THim.

The calculation result processing section 18 calculates the control cell voltage Vi from the future predicted cell voltage Voi(t) calculated by using the look-up table 17 on the basis of a predetermined operation process. In one example, the calculation result processing section 18 calculates an average value of the future predicted cell voltage Voi(t) from the time t=0 to the time t=L as the control cell voltage Vi. In another example, the calculation result processing section 18 calculates a final value Voi(L) of the future predicted cell voltage Voi(t) as the control cell voltage Vi. The filtering process for reducing the measurement noise also can be carried out in the calculation result processing section 18.

It should be noted that in the above-mentioned calculation of the control cell voltage Vi, when the cell temperatures of the cells 4 cannot be measured, a parameter corresponding to the cell temperatures of the cells 4 such as a temperature of the cell module 1 may be used. Additionally, when an environmental temperature of the secondary cell control system 10 is approximately constant, the control cell voltage Vi may be calculated without depending on the measured cell temperatures THim of the respective cells 4.

In addition, the calculation of the control cell voltage Vi in the cell voltage calculating section 2 may be carried out in hardware, may be carried out in software, and may be carried out by a combination of the hardware and software.

The invention claimed is:

1. A secondary cell control system comprises:
a plurality of cells;
a charging circuit section configured to charge cells selected from among said plurality of cells;
a discharging circuit section configured to discharge cells selected from among said plurality of cells;
a cell voltage calculating circuit section configured to calculate control cell voltages based on cell voltages of said plurality of cells or to directly determine the cell voltages as said control cell voltages, with respect to each of said plurality of cells; and
a control circuit section configured to select the cells to be charged and the cells to be discharged from among said plurality of cells in response to said control cell voltages, and
wherein said control circuit section determines a target cell voltage, selects the cells to be discharged based on a comparison result between said control cell voltages and a first threshold value defined by using the target cell voltage, and selects the cells to be charged based on a comparison result between said control cell voltages and a second threshold value defined by using the target cell voltage,
wherein the selection of the cells to be discharged by said control circuit section is carried out based on a comparison result of said control cell voltages and a third threshold value defined by using a minimum value of said control cell voltages in addition to the comparison result of the first threshold value and said control cell voltages, and
wherein the selection of the cells to be charged by said control circuit section carried out based on a comparison result between said control cell voltages and a fourth threshold value defined by using a maximum value of said control cell voltages in addition to the comparison result between the second threshold value and said control cell voltages.

2. The secondary cell control system according to claim 1, wherein said charging circuit section comprises a plurality of charging sections provided for a number equal to that of said plurality of cells and respectively connected to said plurality of cells to charge said plurality of cells.

3. The secondary cell control system according to claim 1, wherein said discharging circuit section comprises a plurality of discharging sections provided for a number equal to that of said plurality of cells and respectively connected to said plurality of cells to discharge said plurality of cells.

4. The secondary cell control system according to claim 1, wherein said charging circuit section comprises charging sections in which at least one of said charging sections is provided for more than one of said plurality of cells,
wherein said discharging circuit section comprises discharging sections provided for a number equal to that of said charging sections, and respectively connected in parallel to said charging sections, and
wherein said secondary cell control system further comprises switches configured to switch connections between said plurality of cells and said charging sections or said discharging sections.

5. The secondary cell control system according to claim 1, wherein said charging circuit section comprises charging sections in which at least one of said charging sections is provided for more than one of said plurality of cells, wherein said secondary cell control system further comprises charging-side switches configured to switch connections between said charging sections and said plurality of cells, and wherein said charging sections charge cells of said plurality of cells which are connected to said charging sections by said charging-side switches.

6. The secondary cell control system according to claim 1, wherein said discharging circuit section comprises discharging sections in which at least one of said discharging sections is provided for more than one of said plurality of cells, wherein said secondary cell control system further comprises discharging-side switches configured to switch connections between said discharging sections and said plurality of cells, and wherein said discharging sections discharge cells of said plurality of cells which are connected to said discharging sections by said discharging-side switches.

7. The secondary cell control system according to claim 1, wherein the target cell voltage is determined as an average value or a median of said control cell voltages of said plurality of cells.

8. The secondary cell control system according to claim 1, wherein said discharging circuit section comprises a plurality of discharging sections provided for a number equal to that of said plurality of cells and respectively connected to said plurality of cells to discharge said plurality of cells, and wherein the cells to be discharged are subjected to actual discharge by said plurality of discharging sections.

9. The secondary cell control system according to claim 1, wherein said charging circuit section comprises a plurality of charging sections provided for a number equal to that of said plurality of cells and respectively connected to said plurality of cells to charge said plurality of cells, and wherein the cells to be charged are subjected to actual charge by said plurality of charging sections.

10. The secondary cell control system according to claim 1, wherein said discharging circuit section comprises discharging sections in which at least one of said discharging sections is provided for more than one of said plurality of cells, and wherein said control circuit section determines priorities based on said control cell voltages when the number of the selected cells to be discharged is larger than the number of said discharging sections, and selects the cells to be actually discharged based on the determined priorities.

11. The secondary cell control system according to claim 1, wherein said discharging circuit section comprises discharging sections in which at least one of said discharging sections is provided for more than one of said plurality of cells, and wherein said control circuit section determines priorities based on recommendation times started with discharge recommendations when the number of the selected cells to be discharged is larger than the number of said discharging sections, and selects the cells to be actually discharged based on the determined priorities.

12. The secondary cell control system according to claim 1, wherein said discharging circuit section comprises discharging sections in which at least one of said discharging sections is provided for more than one of said plurality of cells, and wherein said control circuit section determines priorities based on discharge currents determined to the cells to be discharged or resistance values of variable resistances included in said discharging sections when the number of selected cells to be discharged is larger than the number of said discharging sections, and selects the cells to be actually discharged based on the determined priorities.

13. The secondary cell control system according to claim 1, wherein said discharging circuit section comprises discharging sections in which at least one of said discharging sections is provided for more than one of said plurality of cells, and wherein said control circuit section selects the cells to be actually discharged based on priorities which are determined based on degrees of deterioration of said plurality of cells when the number of selected cells to be discharged is larger than the number of said discharging sections.

14. The secondary cell control system according to claim 1, wherein said discharging circuit section comprises discharging sections in which at least one of said discharging sections is provided for more than one of said plurality of cells, and wherein said control circuit section selects the cells to be actually discharged based on priorities which are determined based on capacities of said plurality of cells when the number of selected cells to be discharged is larger than the number of said discharging sections.

15. The secondary cell control system according to claim 1, wherein said charging circuit section comprises charging sections in which at least one of said charging sections is provided for more than one of said plurality of cells, and wherein said control circuit section determines priorities based on said control cell voltages, recommendation times started with discharge recommendations, charge currents or charge voltages determined to the cells to be charged, degrees of deterioration of said plurality of cells, or capacities of said plurality of cells when the number of selected cells to be charged is larger than the number of said charging sections, and selects the cells to be actually charged based on the determined priorities.

16. The secondary cell control system according to claim 1, wherein said charging circuit section comprises charging sections in which at least one of said charging sections is provided for more than one of said plurality of cells, wherein said discharging circuit section comprises discharging sections provided for a number equal to that of said charging sections and respectively connected in parallel to said charging sections to form pairs, and wherein said control circuit section determines priorities based on said control cell voltages, recommendation times started with discharge recommendations, charge currents or charge voltages determined to the cells to be charged, degrees of deterioration of said plurality of cells, or capacities of said plurality of cells when a total of the number of selected cells to be charged and the number of selected cells to be discharged is larger than the number of pairs of said charging section and said discharging section and selects the cells to be actually charged or discharged based on the determined priorities.

17. The secondary cell control system according to claim 1, wherein said discharging circuit section comprises discharging sections in which at least one of said discharging sections is provided for more than one of said plurality of cells, and wherein the cells selected to be discharged are subjected to discharging in a time-division manner by said discharging sections when the number of cells selected to be discharged is larger than the number of discharging sections.

18. The secondary cell control system according to claim 1, wherein said charging circuit section comprises charging sections in which at least one of said charging sections is provided for more than one of said plurality of cells, and wherein the cells selected to be charged are subjected to charging in a time-division. manner by said charging sections when the number of cells selected to be charged is larger than the number of charging sections.

19. The secondary cell control system according to claim 1, wherein said charging circuit section comprises charging sections in which at least one of said charging sections is provided for more than one of said plurality of cells, wherein said discharging circuit section comprises discharging sections provided for a number equal to that of said charging sections and respectively connected in parallel to said charging sections to form pairs, and wherein the cells selected to be charged and the cells selected to be discharged are subjected to charging and discharging in a time-division manner by said charging sections and said discharging sections when a total of the number of selected cells to be charged and the number of selected cells to be discharged is larger than the number of pairs of said charging section and said discharging section.

\* \* \* \* \*